US006298180B1

(12) United States Patent
Ho

(10) Patent No.: US 6,298,180 B1
(45) Date of Patent: Oct. 2, 2001

(54) PHOTON TRANSISTORS

(76) Inventor: Seng-Tiong Ho, 120 Picardy La., Wheeling, IL (US) 60090

( * ) Notice: Subject to any disclaimer, the term of this patent is extended or adjusted under 35 U.S.C. 154(b) by 0 days.

(21) Appl. No.: 09/396,627

(22) Filed: Sep. 15, 1999

(51) Int. Cl.$^7$ .................................................. G02B 6/26
(52) U.S. Cl. .............................. 385/15; 385/14; 385/16; 385/17; 385/24; 385/39; 385/40; 385/42; 385/46; 385/130; 385/131; 385/122
(58) Field of Search .................................... 385/14, 15, 16, 385/17, 24, 39, 40, 42, 46, 130, 131, 132, 122

(56) References Cited

U.S. PATENT DOCUMENTS

| | | | |
|---|---|---|---|
| 5,005,933 | * 4/1991 | Shimuzu | 385/122 |
| 5,051,789 | 9/1991 | Rosen et al. | 257/19 |
| 5,091,983 | 2/1992 | Lukosz | 385/13 |
| 5,097,357 | 3/1992 | Ranganathan et al. | 359/243 |
| 5,109,156 | 4/1992 | Evans et al. | 359/108 |

(List continued on next page.)

OTHER PUBLICATIONS

Al–hemyari, K. et al., "Ultrafast All–Optical Switching in GaAlAs Integrated Interferometer in 1.55 µm Spectral Region," *Electronic Letters*, 4$^{th}$ Jun. 1992, vol. 28, No. 12, pp. 1090–1091.

Tajima, K. et al., "Ultrafast Polarization–Discriminating Mach–Zehnder All–Optical Switch," Appl. Phys, Kett, 67 (25), Dec. 18, 1995, pp. 3709–4711.

Lattes, Annalisa, et al., "An Ultrafast All–Optical Gate," IEEE Journal of Quantum Electronics, vol. QE–Nov., 19, 1983, pp. 1718–1723.

Nakamura, Shigeru et al., "Analysis of Subpicosecond Full–Switching with a Symmetric Mach–Zehnder All–Optical Switch," Jpn. J. Appl. Phys. vol. 35 (1996), Part 2, No. 11A, Nov. 1, 1996, pp. L1426–L1429.

Citrin, David S. et al., "Constraints on Coherent Control of Quantum–Well Excitons for High–Speed All–Optical Switching," IEEE Journal of Quantum Electronics, vol. 33, No. 3, Mar. 1997, pp. 404–407.

Kane, Michael G., et al. "Asymmetric Optical Loop Mirror: Analysis of an All–Optical Switch," Applied Optics, vol. 33, No. 29, Oct. 10, 1994, pp. 6833–6842.

Ho, Seng–Tion, et al., "Single–beam squeezed–state generation in semiconductor waveguides with x $^{(3)}$ nonlinearity at below half–band gap," J. Opt. Soc. Am., vol. 12, No. 9, Sep. 1995, pp. 1537–1549.

Ho, Seng–Tiong, et al., "Scheme for realizing a photon number amplifier," Optics Letters, vol., 19, No. 1, Jan. 1, 1994, pp. 61–63.

Lee, Sangjae, et al., "Optical switching scheme based on the transmission of coupled gap solitons in nonlinear periodic dielectric media," Optics Letters, vol. 18, No. 12, Jun. 15, 1993, pp. 962–964.

Chu, Daniel Y., et al., "Spontaneous emission from excitions in cylindrical dielectric waveguides and the spontaneous–emission factor of microcavity ring lasers," J. Opt. Soc. Am., vol. 10, No. 2, Feb. 1993, pp. 381–390.

Primary Examiner—Brian Healy
(74) Attorney, Agent, or Firm—Brinks Hofer Gilson & Lione

(57) ABSTRACT

A light transfer device is provided that includes a first light pathway having a first input and a first output and a second light pathway having a second output. The second light pathway is coupled to the first light pathway, and light from the first input is transferable between the first and second light pathways. An active medium is positioned along one of the first and second light pathways, and the active medium is capable of receiving light that modifies the active medium so that the active medium controls the transfer of light between the first and second pathways.

56 Claims, 11 Drawing Sheets

U.S. PATENT DOCUMENTS

| | | | |
|---|---|---|---|
| 5,136,353 | 8/1992 | Pankove et al. | 385/14 X |
| 5,148,505 | 9/1992 | Yanagawa et al. | 385/16 |
| 5,150,242 * | 9/1992 | Fellows | 359/108 |
| 5,158,908 | 10/1992 | Blonder et al. | 437/129 |
| 5,218,198 | 6/1993 | Bristow et al. | 250/227.24 |
| 5,268,785 | 12/1993 | Crenshaw et al. | 359/244 |
| 5,287,302 | 2/1994 | Brandelik et al. | 365/161 |
| 5,315,422 * | 5/1994 | Utaka et al. | 359/107 |
| 5,329,137 | 7/1994 | Taylor et al. | 257/21 |
| 5,375,180 | 12/1994 | Murphy | 385/21 |
| 5,414,282 | 5/1995 | Ogura | 257/187 |
| 5,434,434 | 7/1995 | Kasahara et al. | 257/84 |
| 5,452,383 | 9/1995 | Takiguchi | 385/16 |
| 5,543,631 | 8/1996 | Weinberger | 257/40 |
| 5,569,626 | 10/1996 | Kurtz et al. | 437/228 |
| 5,572,045 | 11/1996 | Takahasi et al. | 257/59 |
| 5,581,108 | 12/1996 | Kim et al. | 257/457 |
| 5,598,492 | 1/1997 | Hammer | 385/27 |
| 5,650,611 | 7/1997 | Nishikawa et al. | 250/225 |
| 5,659,640 | 8/1997 | Joyner | 385/14 |
| 5,682,042 | 10/1997 | Amer et al. | 257/31 |
| 5,689,357 | 11/1997 | Campi | 359/245 |
| 5,699,465 | 12/1997 | Fouquet et al. | 385/18 |
| 5,703,975 * | 12/1997 | Miller et al. | 385/16 |
| 5,709,980 | 1/1998 | Schilling | 430/321 |
| 5,710,845 | 1/1998 | Tajima | 385/16 |
| 5,771,320 | 6/1998 | Stone | 385/16 |
| 5,790,583 | 8/1998 | Ho | 372/92 |
| 5,804,815 | 9/1998 | Loubriel et al. | 250/214.1 |
| 5,804,842 | 9/1998 | Thio | 372/92 |
| 5,808,349 | 9/1998 | Papadopoulos | 372/92 |
| 5,825,799 | 10/1998 | Ho et al. | 372/92 |
| 5,837,995 | 11/1998 | Chow et al. | 250/214 LS |
| 5,878,070 | 3/1999 | Ho et al. | 372/92 |
| 5,878,181 * | 3/1999 | van der Tol | 385/122 |
| 5,887,092 * | 3/1999 | van der Tol | 385/27 |
| 5,926,496 | 7/1999 | Ho et al. | 372/92 |
| 5,937,118 | 8/1999 | Komori | 385/27 |
| 5,963,683 | 10/1999 | Goorjian | 385/16 |
| 5,974,216 | 10/1999 | Nakaya | 385/140 |
| 5,991,475 | 11/1999 | Nelson | 385/16 |
| 6,014,237 | 1/2000 | Abeles et al. | 359/124 |
| 6,049,642 | 4/2000 | Nakamura et al. | 385/16 |
| 6,061,380 | 5/2000 | Jiang et al. | 372/96 |
| 6,064,788 | 5/2000 | Khan et al. | 385/45 |
| 6,075,251 | 6/2000 | Chow et al. | 250/551 |
| 6,078,704 | 6/2000 | Bischel et al. | 385/4 |
| 6,078,717 | 6/2000 | Nashimoto et al. | 385/130 |
| 6,081,634 | 6/2000 | Attard | 385/16 |
| 6,084,992 | 7/2000 | Weber et al. | 385/24 |
| 6,111,998 | 8/2000 | Ido et al. | 385/29 |
| 6,115,170 | 9/2000 | Puzey | 359/278 |
| 6,115,517 | 9/2000 | Shiragaki et al. | 385/24 |

\* cited by examiner

CASE A

LOSS AT λ1
LOSS AT λ2

CASE B

GAIN AT λ1

CASE C

TRANSPARENCY AT λ1
LOSS AT λ2

CASE D

GAIN AT λ1
TRANSPARENCY AT λ2

PHOTON TRANSISTORS

BACKGROUND OF THE INVENTION

The present invention relates to optical devices. In particular, the present invention is related to switching devices and logic implemented using photonic optical devices.

The current generation of computers utilizes a plurality of electronic transistor components. These transistors modulate the resistance to the motion of electrons (and thus current) in order to accomplish a wide variety of switching functions. Transistor electronic action controls or affects the motion of a stream of electrons through "transfer resistance" via the action of another stream of electrons.

Electronic transistors are typically fabricated using semiconductors such as Silicon (Si), and to a far less extent Gallium Arsenide (GaAs). Computing functions are performed by such electronic transistors integrated or grouped together as logic circuits on a very large scale with high device density. Due to various reasons discussed below, however, electronic transistor computing is ultimately limited to maximum data clock speeds of a few GHz in present implementations.

Semiconductor electronic switches generally are thought to have theoretical upper limits on their performance. Achievable minimum switching times are thought to be in the tens of picoseconds (10–20 ps), while minimum achievable switching power consumption and operational energy are thought to be around 1 microwatt (1 $\mu$W) and tens of femto-joule (10–20 fJ) levels, respectively. Such levels imply high frequencies of operation may be possible for electronic computing.

Dense, high-frequency electronic circuit operations utilizing such electronic transistors present several persistent problems and complexities that, whether surmountable or not, are issues of concern to circuit designers. Even though electronic transistors that can operate at faster than tens of GHz do exist, the problems of electromagnetic interference, radiation, and parasitic capacitance in dense circuits limit the clock speed of electronic computers to a range of a few GHz. As the signal wavelength through the circuit becomes comparable to the circuit size, the electronic circuit will act as an efficient antenna radiating radio frequency energy. Electromagnetic signal interference or "crosstalk" is also a significant concern in these electronic circuits. High-frequency electronic circuits can suffer seriously from the problems of electromagnetic interference and radiation. Also, parasitic capacitance problems can plague the operation of a complex high-frequency electronic circuit.

It is thought that an optical circuit for which the signals are carried by light instead of electrical current may be used to eliminate the problems involving electromagnetic interference. Indeed, some present optical communication networks do utilize light transmission for portions of the network in order to increase speed and decrease interference. The problem, however, is that in order for an optical circuit to do useful computational functions, there must be a way to switch optical signals using other optical signals. There have been attempts to construct switches that partially use light beams to switch light beams in an attempt to increase speed. In such attempts, switching an optical beam with another optical beam typically involves electronics to translate an optical signal at some point to an electrical signal which is then returned back to an optical signal at a subsequent time. Such optical communications are not "all-optical communications" and typically interface with or involve electronic componentry. All-optical communications would reduce or eliminate the complexities inherent in the inclusion of electronic elements.

There have been various attempts to switch light with light without the use of electronics. A typical method of switching one light beam via another light beam utilizes a Mach-Zehnder interferometer with a nonlinear optical medium. An exemplary Mach-Zehnder Interferometer 100 is illustrated in FIG. 1. The Mach-Zehnder Interferometer 100 of FIG. 1 includes a pair of mirrors M1 102, M2 104 and a pair of 50 percent beam splitters BS1 106, BS2 108. A Signal Beam Input 110 input into the Interferometer 100 is split into a pair of beams 112, 114 via the 50 percent beam splitter BS1 106. The beams 112 and 114 are recombined at the beam splitter BS2 108 to form a pair of resultant beams. Signal Beam Output A 116 and Signal Beam Output B 118. If the beams 112 and 114 face equal optical path lengths as the beams 112 and 114 traverse the upper and lower arms, respectively, of the Interferometer 100, then the beams 112 and 114 will constructively interfere to become Signal Beam Output A 116 and destructively interfere to become Signal Beam Output B 118. Hence, in this event, no signal beam will be output as beam 118, while the full combined signal beam will be output as beam 116.

A Nonlinear Refractive Index Medium 120 of length Lm, known to those in the art as an optical Kerr medium, is positioned in the upper arm of the Mach-Zehnder Interferometer 100, as shown in FIG. 1. A Control Beam Input 122 with a polarization orthogonal to that of the beam 112 is introduced via a polarization beam splitter PBS1 124. The Control Beam Input 122 propagates through and exits the medium 120 and is output from the Interferometer 100 via a polarization beam splitter PBS2 126. The medium 120 has nonlinear optical properties, in that exposing the medium 120 to a strong light beam (in this case the Control Beam Input 122), can alter the refractive index of the medium 120. When the Control Beam Input 122 is on, the refractive index of the medium 120 will change according to the optical intensity, which is proportional to photons per unit time per unit area, of the beam 122. The refractive index of medium 120 can increase or decrease, which in turn causes the beam 112 in the upper arm of the Interferometer 100 to undergo an additional phase shift. This phase shift causes the destructive interference of the beams 112 and 114 at the beam splitter BS2 108 to become constructive in forming Signal Beam Output B 118. Similarly, the phase shift causes the constructive interference of the beams 112 and 114 at BS2 108 to become destructive in forming Signal Beam Output A 116. This phenomenon leads to a net switching of signal output from beam 116 (A) to beam 118 (B). When the Control Beam Input 122 is viewed as a second input signal to the Interferometer 100, this dual input, dual-output all-optical switch can be viewed as performing optical logic operation equivalent to an "AND" gate used in the electronics realm.

The Mach-Zehnder devices such as interferometer 100 can achieve all-optical switching, but due to the lack of materials with a sufficiently high nonlinear refractive index, switches of this variety typically suffer from a number of problems and drawbacks. First, the device size (indicated by Lm in FIG. 1) is large. For a medium with a reasonably high nonlinear refractive index, a device length of 1 centimeter (1 cm) or longer is needed, assuming a control power on the order of hundreds of Watts. The large size of the device clearly prohibits their use in large-scale optical logic circuit integration. Second, the switching power required is very high, in that a control power of hundreds of Watts or more is required to operate the device at high speed. Third, the speed of switching is slow if the switch is operating at close to the atomic resonant frequency of the medium. While the nonlinear effect can be substantially higher when operated at close to resonance, thereby reducing the switching power, the speed of the switching operation will be slow due to real carrier excitation in the medium limiting the switching speed to below the hundreds of megahertz for a semiconductor medium. Fourth, the Mach-Zehnder device is very sensitive to device design parameter variations and vibration because of the dependence of the device on the optical path-length balance between the two arms of the interferometer, as described above.

Other variations of all-optical switching devices exist, such as one device (not shown) that uses a cavity to enhance the intensity in a medium or to achieve optical bi-stability. This device also suffers from one or more of the problems and/or drawbacks listed above with regard to the Mach-Zehnder device. These problems make the current all-optical switching devices impractical for applications to form large-scale or dense optical logic circuits. In fact it is often quite challenging to cascade even a few of the current all-optical switching devices to work together.

In order for computers to perform faster, and to circumvent many of the complexities that accompany electronic transistor computing at increased speeds, new compact technology must be developed. It would be advantageous to provide an all-optical logic circuitry or device family capable of improved speed, of implementation at high or very high density due to smaller device sizes, of operation at lower switching energy and power consumption levels, and improved immunity to device variations.

BRIEF SUMMARY OF THE INVENTION

In accordance with the present invention, many of the disadvantages associated with prior electrical transistor-based devices and optical beam switching devices are addressed.

In particular, the devices described herein achieve optical switching at high speed. Using these photonic devices, it is possible to build ultrafast logic gates that can operate at a speed of 10 GHz to 10000 GHz or faster, which will enable the realization of computers operating with a clock rate that is 10 to more than 100 times faster than that of the current electronic computers having a 1 GHz clock rate.

In addition to their superior speed of operation, phosistors are also advantageous in that the signal transfer (that is, the light transfer) in the photonic circuit is via an optical beam with short optical pulses well-confined within optical waveguides. This configuration results in very little signal interference. Furthermore, optical beams do not radiate radio frequencies. Hence, while high-frequency electronic circuits can suffer seriously from the problems of electromagnetic interference and radiation, and parasitic capacitance, photonic circuits do not suffer from such problems.

Like electronic transistors, phosistors will have a. wide range of other general applications apart from applications to computers, such as applications to optical communications, optical signal processing, optical sensing or quantum optical communications. For example, in optical communications, those devices will have important applications to the realization of ultrafast (Tera-bit) all-optical communications for which a stream of optical pulses is being switched at very high (Tera-Hertz) speeds directly via another stream of optical pulses without involving electronics. By enabling one to directly switch an optical beam with another optical beam without the complications of using electronics to transfer the optical signal to electrical signal and then transfer back again, these phosistors may have applications for optical communication networks even at low speed.

In one aspect of the present invention, a light transfer device is provided that includes a first light pathway having a first input and a first output and a second light pathway having a second output. The second light pathway is coupled to the first light pathway, and light from the first input is transferable between the first and second light pathways. An active medium is positioned along one of the first and second light pathways, and the active medium is capable of receiving light that modifies the active medium so that the active medium controls the transfer of light between the first and second pathways.

In yet another aspect of the present invention, a light transfer component is provided that includes a first light pathway having a first input and a first output and a second light pathway having a second output. The second light pathway is coupled to the first light pathway, and light from the first input is transferable from the first input of the first light pathway to the second output of the second light pathway. An active medium is positioned along the first light pathway. The medium is capable of receiving light that modifies the active medium so that at least a portion of the light from the first input remains on the first light pathway and is output from the first output of the first light pathway.

In yet another aspect of the present invention, a light transfer component is provided that includes a first light pathway having a first input and a first output and a second light pathway having a second output. The second light pathway is coupled to the first light pathway, and light from the first input is transferable from the first input of the first light pathway to the second output of the second light pathway. An active medium positioned along the second light pathway.

In yet another aspect of the present invention, a light transfer component is provided that includes a first light pathway having a first input and a first output and a second light pathway having a second output. The second light pathway is coupled to the first light pathway, and light from the first input is transferable from the first input of the first light pathway to the second output of the second light pathway. An active medium is positioned along the first light pathway and is capable of receiving light that modifies the active medium so that substantially all of the light from the first input no longer remains on the first light pathway.

The present invention may also be embodied in a light transfer device including a first light pathway having a first input and a first output and a second light pathway having a second output. The second light pathway is optically coupled to the first light pathway, and light from the first input is transferable from the first input of the first light pathway to the second output of the second light pathway. An active medium is positioned along the second light pathway that is capable of receiving light that modifies the active medium so that at least a portion of the light from the first input remains on the first light pathway and is output from the first output of the first light pathway.

The present invention may further be embodied in a multi-port light transfer device, in which an active excitable medium is provided and is capable of receiving input energy in the form of light propagating from a first port to a second port via wave coupling. The active excitable medium can transfer a portion of the light energy to at least a third port in response to the presence or absence of light into the third port and incident on the active excitable medium.

In another aspect of the present invention, a light transfer device is provided that has a first structure capable of wave propagation. The first structure includes a first device input port for receiving a first optical beam, a first device output port connected to the first device input port along the length of the first structure, and an active excitable medium positioned between the first device input and first device output ports along a portion of the length of the first structure. The active excitable medium is capable of receiving a second optical beam that modifies the interference properties of the active excitable medium. Thus, the first optical beam is amplified photonically and achieves gain through the active excitable medium to create a third optical beam. A second structure is also provided that is capable of wave propagation and which is positioned adjacent to the first structure. The second structure is coupled to the first structure so that the first optical beam is transferred from the first structure to the second structure with negligible loss. The second structure comprises a second output port for transmission of the transferred first optical beam.

In yet another aspect of the present invention, a light transfer device is provided that includes a first, second and third structure each capable of wave propagation. The first structure includes a first device input port for receiving a first optical beam, a first device output port connected to the first device input port along the length of the first structure, and an active excitable medium positioned between the first device input and first device output ports along a portion of the length of the first structure. The second structure is positioned at least partly adjacent the first structure and is coupled to the first structure so that the first optical beam is transferred from the first structure to the second structure with negligible loss. The third structure is positioned next to the first structure and is capable of coupling a second optical beam received at the second device input to the first structure so that when the second optical beam is present, the second optical beam modifies the interference properties of the active excitable medium. The first optical beam is amplified photonically and achieves gain through the active excitable medium to create a third optical beam which is directed in part to the first device output port. When the second optical beam is not present, the active excitable medium is transparent to the first optical beam so that no third optical beam is created.

In yet another aspect of the present invention, a device for transmitting photons is provided that includes a first and a second waveguide. The first waveguide includes a first port for receiving a first optical beam, a second port, and an active medium. The active medium is capable of excitement by a third optical beam to provide gain to the first optical beam in the form of stimulated photon emission. This emission creates a separate, second optical beam that propagates toward the second port. The second waveguide is coupled to the first waveguide and includes a third port. The coupling between the first and second waveguide allows the diversion of photons in the first optical beam from the first waveguide to the second waveguide toward the third port.

The present invention may also be embodied in a method of manipulating an active medium and energy in the form of light to implement a logical switching function. The method includes the steps of driving the active medium to one of a plurality of states with a continuous wave power supply beam, applying input energy in the form of light to drive the active medium to another of the plurality of states, and controlling output energy in the form of light through the driving of the active medium and the application of the input energy.

In another aspect of the present invention, a method is provided of transmitting a first power light beam through a transmission device including at least a first and a second coupled waveguide. The method includes the steps of providing an active medium along one of the first and second waveguides, providing the first power light beam to an input of the first waveguide, channeling the first power light beam from the first waveguide to the second waveguide, and exciting the active medium by introducing a second, higher-wavelength switching light beam to the active medium. This changes the interference properties of the medium and create a third, lower wavelength signal light beam propagating toward an output of the first waveguide.

In yet another aspect of the present invention, a directional coupler capable of modifying the propagation direction of a low energy photon beam via a self-interference effect of the first propagating beam is provided. The coupler includes a first input signal port capable of receiving the low energy photon beam, a second input signal port capable of receiving a high energy photon beam, and an active medium positioned near the second input signal port. The active medium is drivable to a gain state by the incidence of the high energy photon beam, and the active medium is otherwise drivable to a transparency state. A first output port capable of transmitting a low energy photon beam from the active medium is also provided. The low energy photon beam will be amplified when the active medium is in the gain state and of negligible energy when the active medium is in the transparency state.

The invention may be further embodied in a logic device including a plurality of directional couplers. The directional couplers are each capable of modifying the propagation direction of a low energy photon beam through an active medium. The active medium has interference properties modifiable via a high energy photon beam. The directional couplers are linked by inputs and outputs capable of transmitting the low energy photon beam through one or more switchable propagation paths.

The invention may be further embodied in a logic device including first and second wave coupler devices. The first wave coupler device includes a first light pathway receiving light from a first input and a second light pathway having a second output. The second light pathway is coupled to the first light pathway, and light from the first input is transferable to the second light pathway. An active medium is positioned along one of the first and second light pathways. The second wave coupler device includes a third light pathway receiving light from one of the first and second pathways of the first wave coupler device and a fourth light pathway having a second output. The fourth light pathway is coupled to the third light pathway, and light from the third light pathway is transferable to the fourth light pathway. An active medium is positioned along one of the third and fourth light pathways.

The foregoing and other features and advantages of the presently preferred embodiments of the present invention will be more readily apparent from the following detailed description, which proceeds with references to the accompanying drawings.

Beside their use as optical switches, the disclosed devices according to the present invention can perform a variety of functions, including logical operations, optical flip-flops, optical wavelength translation, electro-optical switches, optical detection, optical memory, and quantum optical operations, which therefore creates a new class of devices.

BRIEF DESCRIPTION OF THE DRAWINGS

Exemplary embodiments of the present invention are described with reference to the following drawings, wherein.

DETAILED DESCRIPTION OF THE PRESENTLY PREFERRED EXEMPLARY EMBODIMENTS

Figure 1:
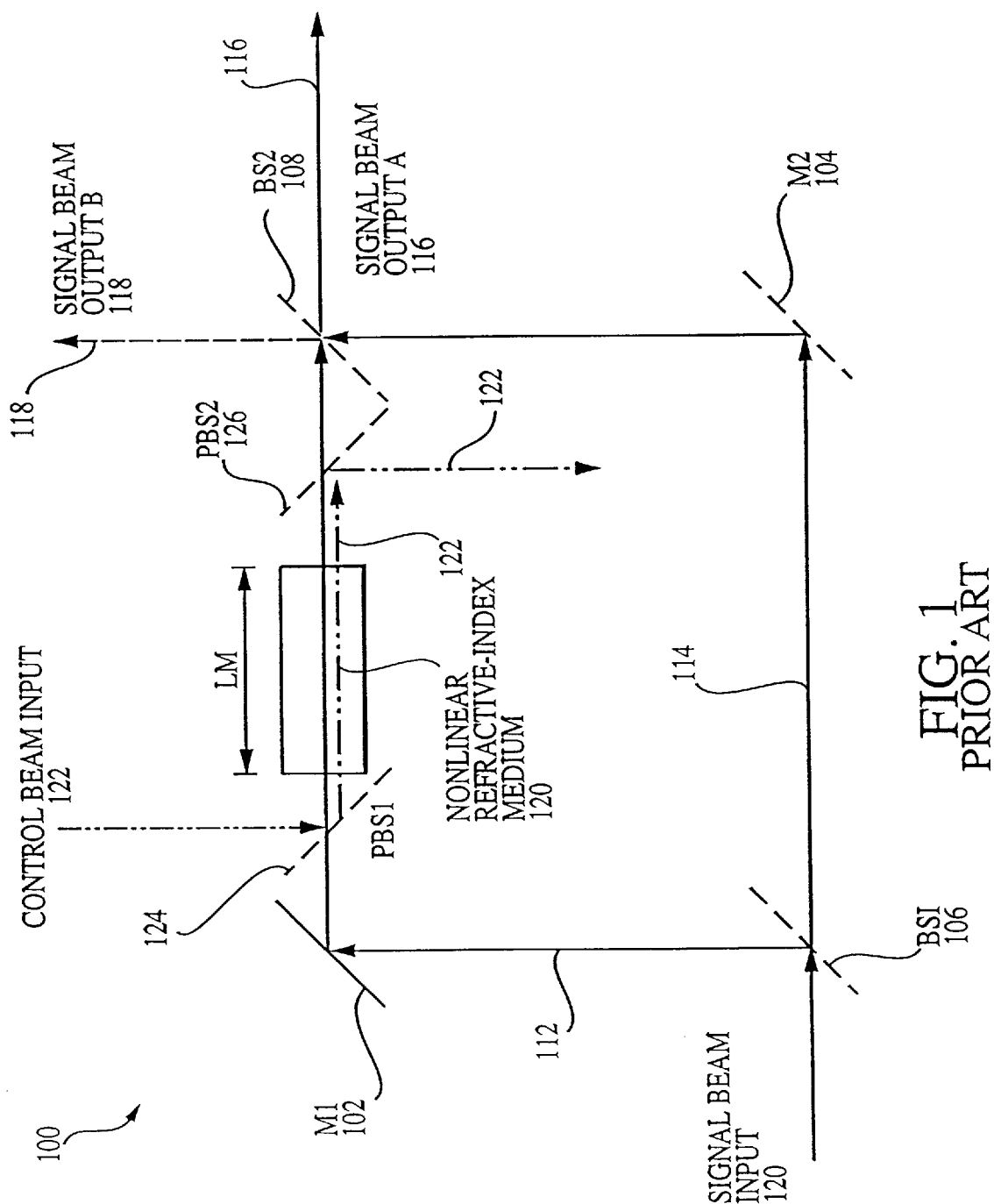
FIG. 1 is an illustration of an exemplary prior art Mach-Zehnder Interferometer all-optical switching device.

Described herein are a new class of photonic devices, referred to as photon transistors (or "photon-transfer photon-resistors"). The word "resistor" is used here to describe the resistance to the motion of photons, not electrons. The photon transistor devices and the exemplary embodiments described herein will allow faster logic gates to be built and faster computers to be realized using high-density photonic integrated circuits.

The name "photon transistor" is derived from the fact that the devices and exemplary embodiments described herein use a combination of means to resist or enhance the flow of photon flux in a certain direction by turning on and off the interference pathway via the action of another photon flux on any active medium. The interference pathway determines the propagation direction of the flow of photon flux in the photon transistor(s) (hereafter "phosistor(s)"). This action is the photonic analogue of the action of an electronic transistor wherein the motion of a stream of electrons is effected or controlled through "transfer resistance" via the action of another stream of electrons.

The Underlying Physics of the Active Medium

The photon transistor or phosistor devices and presently preferred exemplary embodiments detailed herein are based on the interaction of photons with active materials or media having multiple upper-energy levels. An example of one such active material is a semiconductor material. Most of these phosistors and related devices utilize two or more wavelengths of light. For the case of two wavelengths, the light beam interacting with the lower upper-energy level of the active material will have a longer wavelength than that of the beam interacting with the higher upper-energy level. In general, the longest wavelength is denoted as $\lambda_1$, and all subsequently shorter wavelengths as $\lambda_2$, $\lambda_3$, . . . etc. In this notation $\lambda_1 > \lambda_2 > \lambda_3 >$ . . . etc. The upper-energy levels for which these wavelengths interact with will be denoted by $E_1$, $E_2$, $E_3$ . . . etc, respectively, with $E_1 < E_2 < E_3$ . . . etc. If the ground-energy level for which an electron in energy level $E_n$ can make a radiative transition to is denoted as $E_{gn}$, then $\lambda_n$ will be related to $E_n$ via $E_n - E_{gn} = h\nu_n$, where the frequency is $\nu_n = c/\lambda_n$, c is the speed of light in free space and h is Planck's constant, $6.6262 \times 10^{-34}$ J–s.

The general requirement of the active medium is that the medium must have a general ground-energy level (it can consist of a series of related ground-energy states or levels) and a number of upper-energy levels. That is, the active material or medium having multiple upper-energy levels may be defined as having multiple ground energy levels, or states. The ground-energy states are generally connected in that after an electron from an upper-energy level $E_n$ makes a radiative transition to a ground-energy level $E_{gn}$, it may move, or relax, to other ground energy levels and can subsequently be excited to another upper-energy level. Thus, as far as the general operation of the active medium is concerned, the ground levels may be seen as a state reservoir holding a finite number of ground-energy electrons.

A further requirement is that electrons excited to the upper-energy levels must generally relax back to the lower upper-energy level fast compared to the decay rate between an upper-energy level and the general ground-energy level. That is, electrons excited to the higher upper-energy level will relax rapidly to the next upper-energy level, ultimately filling the lowest upper-energy level rapidly and then continuing to fill the next higher upper-energy levels. This property is called upper-state relaxation. The rate of upper-state relaxation is fast compared to the radiative transition between an upper-energy level $E_n$ and a ground-energy level $E_{gn}$.

With respect to the general requirements of the active medium, three useful and exemplary active media are: (1) an essentially two-level system with a general ground-energy level and an upper-energy level (2) an essentially three-level system with a general ground-energy level and two upper-energy levels, and (3) an essentially four-level system with a general ground-energy level and three upper-energy levels.

It should be understood that these three systems are described for exemplary purposes and do not consist of or exhaust all possibilities for multi-level systems contemplated by and within the scope of the active medium utilized in the phosistor devices and embodiments described herein.

An exemplary embodiment of the active medium will be a semiconductor having a bandgap energy $E_{Gap}$ for which the lowest upper-energy level $E_1$ discussed above will be the lowest state above the bandgap or lowest upper-bandgap state. Any electrons excited to above the bandgap energy will relax to the energy $E_1$ very rapidly (in hundreds of femtoseconds or less) and will fill up the states of higher upper-energy states after the lower upper-energy states have been filled up. In the case of semiconductors, the higher upper-energy level $E_2$ discussed above can be a particular upper-bandgap state above the energy $E_1$. The speed of upper-state relaxation from $E_2$ to $E_1$ will depend on the energy separation between $E_1$ and $E_2$. A larger energy difference will slow down the relaxation rate. The relaxation time is typically around hundreds of femtoseconds or faster. This relaxation time is fast compared to the time it takes an electron to decay from $E_1$ to the ground state $E_g$, which is usually around a few nanoseconds to hundredths of a picosecond.

It should be understood that while a semiconductor material is a convenient active material or medium that can be used for phosistors, it is not the only medium that can be utilized. Other than semiconductor media, there are many other atomic, molecular, ionic, or low-dimensional electronic media, such as quantum wells, quantum wires, or quantum dots, for example, that can satisfy the general requirements of the medium described and that are known to those skilled in the art.

Figure 2A:
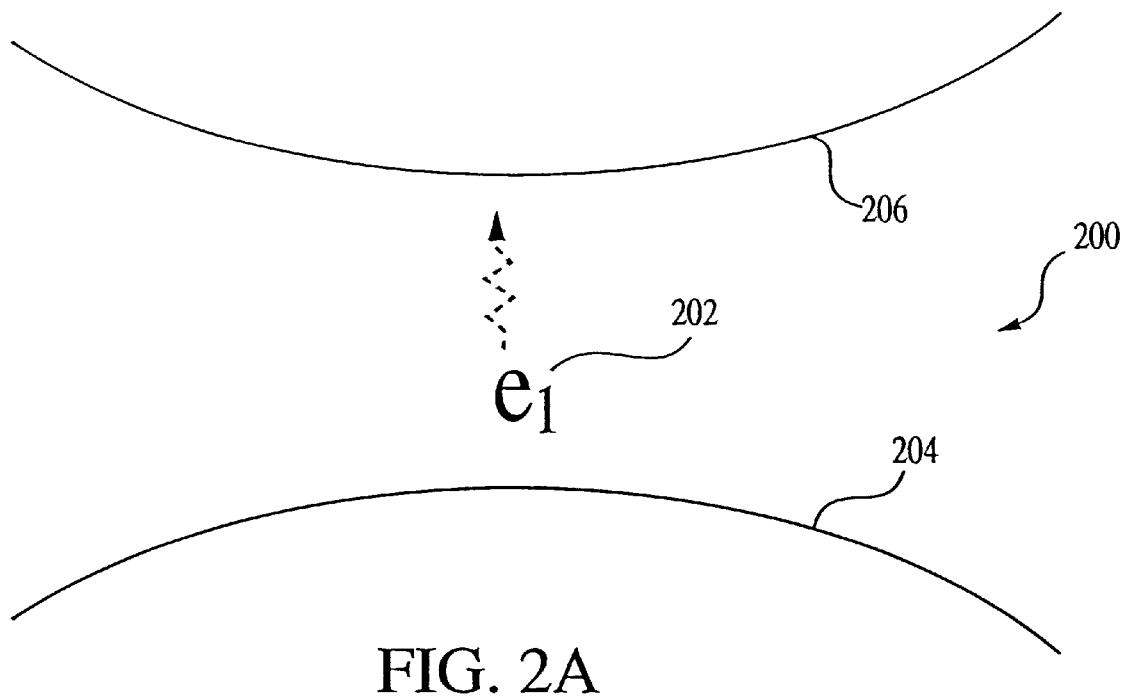
FIGS. 2A–C illustrate a system having essentially two energy levels used to describe an exemplary semiconductor active medium.
Figure 2B:
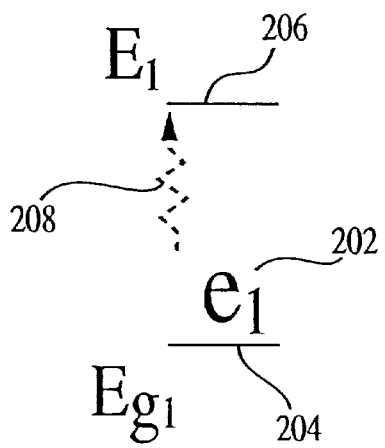
Figure 2C:
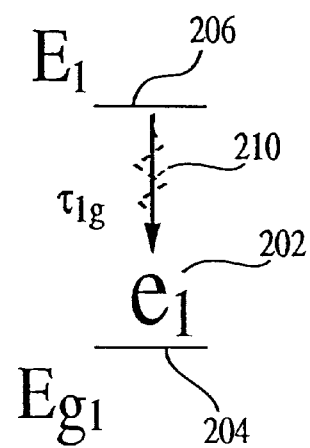
Figure 3A:
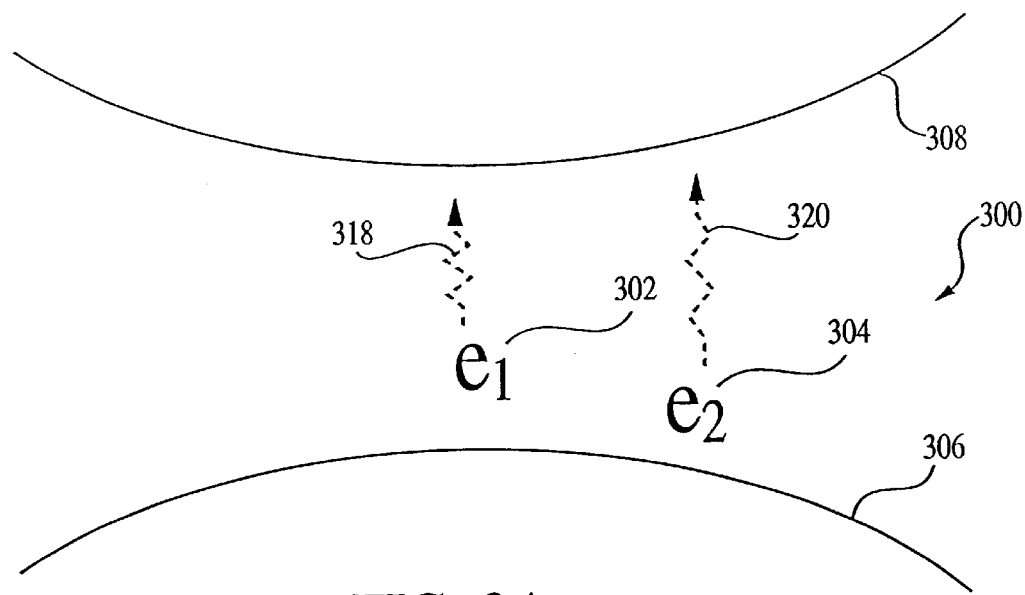
FIGS. 3A–C illustrate a system having essentially three energy levels used to describe an exemplary semiconductor active medium.
Figure 3B:
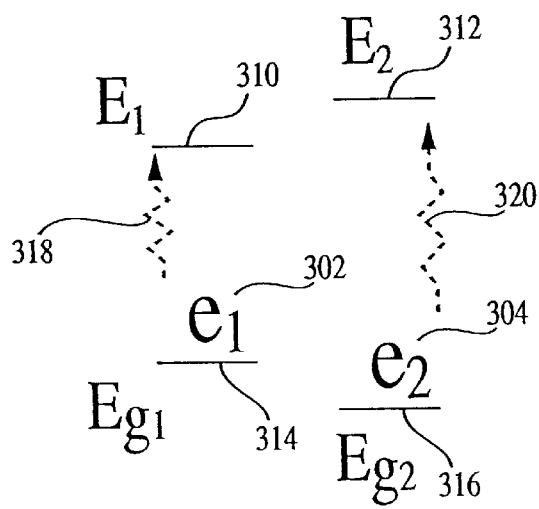
Figure 3C:
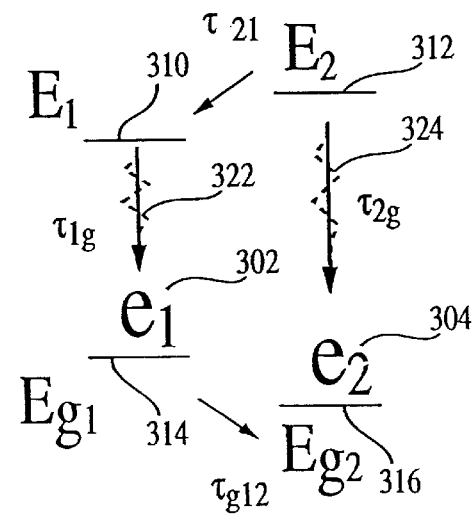

For purposes of illustration and not limitation, semiconductor will be used as the active material or medium for the discussion of multi-level systems. A first, essentially two-level system having a general ground-energy level and an upper-energy level is illustrated in FIGS. 2A–C. A second, essentially three-level system with a general ground-energy level and two upper-energy levels is shown in FIGS. 3A–C. A third, essentially four-level system with a general ground-energy level and three upper energy levels, while not illustrated, is easily extrapolated from the three level system by those skilled in the art and follows from FIGS. 3A–C and 2A–C.

It should be understood that these three systems are described for exemplary purposes and do not consist of or exhaust all possibilities for multi-level systems contemplated by and within the scope of the active medium utilized in the phosistor devices and embodiments described herein.

FIGS. 2A–C illustrate the case of essentially two energy levels or a essentially two level system 200 for a semiconductor active medium. FIG. 2A illustrates a single electron $e_1$ 202 that is excited from a general ground-energy level 204 to an upper-energy level 206. FIG. 2B is a diagram illustrating the excitation of the electron $e_1$ 202 from the general ground-energy level $E_{g1}$ 204 to the upper-energy level $E_1$ 206. In FIGS. 2A and 2B, a zigzag dashed-line arrow 208 is used to represent the excitation from low to high energy via absorbtion of light. FIG. 2C is a diagram illustrating the free spontaneous decay of the electron $e_1$ 202 from the upper-energy level $E_1$ 206 to the general ground-energy level $E_{g1}$ 204. In FIG. 2C, a solid line arrow 210 is used to represent the electron decay from high to low energy while the rate of this transition between $E_1$ 206 and $E_{g1}$ 204 is denoted by $\tau_{1g}$.

As described above, the general ground-energy level has one or more electrons that can be excited to the various upper-energy levels. In general, the transition time between any two upper-energy levels, level m ($E_m$) and level n ($E_n$), is denoted by $\tau_{mn}$ where m, n are 1,2,3 . . . etc. and the free spontaneous decay transition rate between the upper-energy level $E_m$ and the general ground-energy level $E_g$ is denoted by $\tau_{mg}$, which will be slow compared to $\tau_{mn}$.

FIGS. 3A–C illustrate the case of essentially three energy levels or a essentially three level system 300 for a semiconductor active medium. FIG. 3A illustrates a pair of electrons $e_1$ 302 and $e_2$ 304. The electrons 302 and 304 can be excited from a general ground-energy level 306 to an general upper-energy level 308. As illustrated in FIGS. 3B and 3C, the essentially three-level system can be represented by four sublevels: a pair of upper-energy levels $E_1$ 310, $E_2$ 312 with $E_1<E_2$ and a pair of ground-energy levels $E_{g1}$ 314, $E_{g2}$ 316 with $E_{g1}>E_{g2}$. The medium can thus be modeled as a collection of atoms with four energy levels. Each atom is assumed to have two electrons $e_1$ 302 and $e_2$ 304, initially occupying the ground-energy levels $E_{g1}$ 314 and $E_{g2}$ 316 with $E_{g2}<E_{g1}$. In particular, FIG. 3B is a diagram illustrating the excitation of the two electrons $e_1$ 302 and $e_2$ 304 from the ground-energy levels $E_{g1}$ 314 and $E_{g2}$ 316, respectively, to the upper-energy levels $E_1$ 310 and $E_2$ 312. In FIGS. 3A and 3B, zig-zag dashed-line arrows 318 and 320 are used to represent the excitation from low to high energy of the electrons $e_1$ 302 and $e_2$ 304, respectively.

FIG. 3C is a diagram illustrating the relaxation and transition or decay of the electrons $e_1$ 302 and $e_2$ 304 in the essentially three energy level system. When an electron ($e_2$ 304 for example) in $E_{g2}$ 316 is removed (e.g. by exciting it to $E_2$ 312 as in FIG. 3B), the electron ($e_1$ 302 for example) in $E_{g1}$ 314 will relax to fill the state at $E_{g2}$ 316, since the Pauli exclusion principle, as is known to those skilled in the art, allows only one electron to fill one state. The relaxation time between the upper-energy levels $E_2$ 312 and $E_1$ 310 is denoted by $\tau_{21}$, while the relaxation time between the ground-energy levels $E_{g1}$ 314 and $E_{g2}$ 316 is denoted by $\tau_{g12}$. In FIG. 3C, solid line arrows 322, 324 are used to represent the free electron decay from high to low energy. The transition time between the upper-energy level $E_1$ 310 and $E_{g1}$ 314 will be denoted by $\tau_{1g}$ and between the upper-energy level $E_2$ 312 and $E_{g2}$ 316 will be denoted by $\tau_{2g}$. As described above, typically $\tau_{21}$ and $\upsilon_{g12}$ are relatively fast with a femtosecond time scale, while $\tau_{1g}$ and $\tau_{2g}$ are relatively slow having times roughly on the scale of nanoseconds to hundreds of picoseconds.

Likewise, a essentially four-level system (not illustrated) can be represented by three upper-energy levels $E_1$, $E_2$, $E_3$ with $E_1<E_2<E_3$ and three ground-energy levels $E_{g1}$, $E_{g2}$, $E_{g3}$ with $E_{g1}>E_{g2}>E_{g3}$, three electrons $e_1$, $e_2$, and $e_3$, two relaxation times $\tau_{21}$ and $\tau_{32}$ between the upper-energy levels, two relaxation times $\tau_{g12}$ and $\tau_{g23}$ between the ground-energy levels, and three free spontaneous decay transition times $\tau_{1g}$, $\tau_{2g}$, $\tau_{3g}$ between the upper-energy levels and the ground energy levels. While this case is not illustrated, it is easily extrapolated from the three level system by those skilled in the art and follows from FIGS. 3A–C and 2A–C.

FIGS. 4A–D illustrate several states of the essentially three-level semiconductor medium 300 described above and illustrated in FIGS. 3A–C. The active or interacting medium is typically an excitable medium. Every operating wavelength $\lambda_1$, $\lambda_2$, $\lambda_3$, . . . etc. of the excitable medium in general, as opposed to just the particular case of a semiconductor active medium, can be in one of three basic states, namely (1) absorption, (2) gain, and (3) transparency, depending on the conditions of excitation. Returning to the specific case of the exemplary semiconductor active medium 300, the medium 300 has two operating wavelengths $\lambda_1$ and $\lambda_2$, as illustrated in FIGS. 4A–D. For simplicity of illustration, and using the same nomenclature as in FIGS. 3A–C, the system 300 is made up of two electrons, $e_1$ 302 and $e_2$ 304. It should be understood that the two electrons, $e_1$ 302 and $e_2$ 304 are used for illustration purposes to explain and to model complex processes at a high-level, as is familiar to those skilled in the art. The essentially three-level semiconductor system 300 has the pair of upper-energy levels $E_1$ 310, $E_2$ 312 with $E_1<E_2$ and the pair of ground-energy levels $E_{g1}$ 314, $E_{g2}$ 316 with $E_{g1}>E_{g2}$.

Figure 4A:
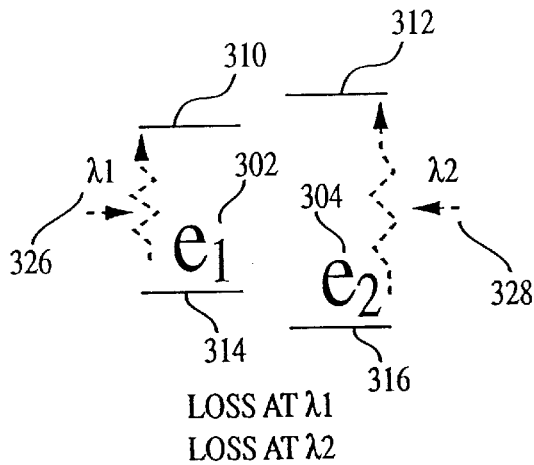
FIGS. 4A–D illustrate the states of a system having essentially three energy levels and operating under two wavelengths.

FIG. 4A illustrates the state corresponding to loss or absorption for the photon beam 326 at $\lambda_1$, and loss or absorption for the photon beam 328 at wavelength $\lambda_2$. As illustrated in FIG. 4A, when there are no input beams, the electrons $e_1$ 302 and $e_2$ 304 will be in the ground-energy levels $E_{g1}$ 314 and $E_{g2}$ 316, respectively. In this state, the medium 300 will be an absorbing medium for a photon beam 326 having a wavelength of light at $\lambda_1$ 326 or a photon beam 328 having a wavelength of light at $\lambda_2$. When the medium 300 absorbs the photons at $\lambda_1$ 326 or $\lambda_2$ 328, the electrons $e_1$ 302 and $e_2$ 304 will be excited to upper energy level $E_1$ 310 or $E_2$ 312, respectively (represented by the zigzag dashed-line arrows). The rate of the electronic transition or photon absorption is called the photon absorption rate (or electron excitation rate). As is known to those skilled in the art, this transition rate is determined by the rate at which photons are captured by the medium and is not limited by the slow free spontaneous decay rate. The medium 300 is said to be in the absorbing state at $\lambda_1$ 326 and $\lambda_2$ 328. This state is illustrated in FIG. 4A.

In FIGS. 4A–D an upward pointing (from low to high energy) zigzag dashed-line arrow represents loss or absorption of photons and electron excitation, a downward pointing (from high to low energy) zigzag dashed-line arrow represents gain of photons and electron decay, and a simultaneously upward and downward pointing zigzag dashed-line arrow represents transparency, wherein an electron has a nearly equal probability of being at the general ground-energy level 306 (see FIG. 3A) ($E_{g1}$ 314 and $E_{g2}$ 316) or at the associated upper-energy level 308 (see FIG. 3A) ($E_1$ 310 or $E_2$ 312) and photons experience neither a net gain nor a net loss. A solid arrow represents the movement of electrons. In terms of the electrons $e_1$ 302 and $e_2$ 304, a dashed or dotted "e" represents the split location state of an electron, while transparent "e" and solid "e" represent the initial and final locations, respectively, of an electron.

Figure 4B:
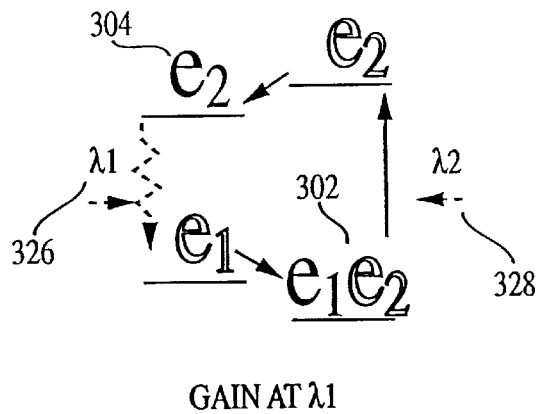

FIG. 4B illustrates the state corresponding to gain for the photon beam 326 at $\lambda_1$. FIG. 4B illustrates an excitation of the medium 300 with a photon beam 328 at $\lambda_2$ which will bring the electron $e_2$ 304 from the ground-energy levels (in particular $E_{g2}$ 316) to the upper-energy level $E_2$ 312. The electron $e_2$ 304 will quickly relax back to the lower upper-energy level $E_1$ 310 (within a hundreds of femtosecond time scale for the semiconductor medium 300). That is, electron $e_2$ 304 is brought to level $E_1$ 310 from level $E_{g2}$ 316 due to a photon beam 328 at $\lambda_2$. There is then electron population inversion between level $E_1$ 310 and the ground-energy level $E_{g1}$ 314 (i.e. the number of electrons in level $E_1$ 310 is more than that in $E_{g1}$ 314 (shown in FIG. 3A)). In this state, a photon beam 326 at $\lambda_1$ will "stimulate" the decay of the electron $e_2$ 304 from $E_1$ 310 to $E_{g1}$ 314, enabling the medium 300 to emit a photon at a wavelength of $\lambda_1$ (not illustrated in FIG. 4B), thereby achieving energy gain for the photon beam 326 at wavelength $\lambda_1$. This result is referred to as stimulated emission. The rate of the electronic stimulated decay or photon stimulated emission is called the photon stimulated emission rate (or electron stimulated decay rate). As is known to those skilled in the art, this transition rate is determined by the rate at which photons interact with the medium and is not limited by the slow free spontaneous emission rate. In this state illustrated in FIG. 4B, the medium 300 is said to be in the gain state at $\lambda_1$ 326.

Figure 4C:
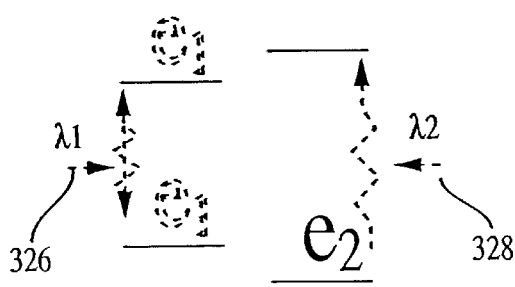

FIG. 4C illustrates the state corresponding to transparency for the photon beam 326 at $\lambda_1$, and loss for the photon beam 328 at wavelength $\lambda_2$. It might appear at first that electron population inversion can be achieved by exciting the electron $e_1$ 302 from $E_{g1}$ 314 to $E_1$ 310 directly by a photon beam 326 at $\lambda_1$. This is not the case, however, for the reason that when an electron population builds up at $E_1$ 310, the same photon beam 326 at $\lambda_1$ will also cause the stimulated decay of the electron 302 from $E_1$ 310 back to $E_{g1}$ 314. If the intensity $I_1$ of the photon beam 326 at $\lambda_1$ is very strong, this intensity will cause close to half-electron population inversion between $E_{g1}$ 314 to $E_1$ 310. In this instance, the photon stimulated emission rate is approximately equal to the photon absorption rate). In this state, the medium 300 will not absorb many photons from the beam 326 at $\lambda_1$ or give much gain (cause photons to be emitted) in response to the beam 326 at $\lambda_1$. Instead the medium 300 will act as a nearly transparent medium at $\lambda_1$ 326. In this state, the medium 300 is said to be in the transparency state at $\lambda_1$ 326. This state is illustrated in FIG. 4C with the nearly half-populated electron $e_1$ 302 represented with dashed or dotted lines. This transparency state is represented with the simultaneously upward and downward pointing zigzag dashed-line arrow. The critical intensity that is required for the photon beam 326 at wavelength $\lambda_1$ to bring about this transparency condition is called the saturation intensity and will be denoted as $I_{1Sat}$. That is, when $I_1 = I_{1Sat}$, the absorption of the medium 300 will reduce to about half and the medium 300 will rapidly approach transparency when $I_1 > I_{1Sat}$.

Figure 4D:
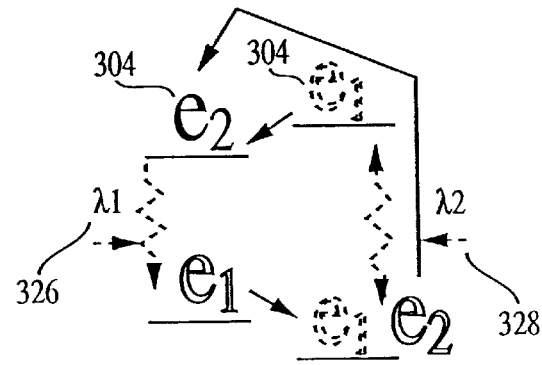

FIG. 4D illustrates the state corresponding to gain for the photon beam 326 $\lambda_1$, and transparency for the photon beam 328 at wavelength $\lambda_2$. Similarly to FIG. 4C, if the intensity $I_2$ of the photon beam 328 at $\lambda_2$ is strong enough, the beam 328 at $\lambda_2$ not only will bring electron $e_2$ 304 to $E_1$, causing gain at the photon beam 326 at $\lambda_1$, it will also further drive $E_2$ 312 and $E_{g2}$ 316 to transparency at $\lambda_2$ by partially exciting the electron $e_2$ 304 from $E_{g2}$ 316 to $E_2$ 312. This situation is illustrated in FIG. 4D.

It should be understood that although photon beams 326 and 328 of wavelength $\lambda_1$ and $\lambda_2$ are shown in each of FIGS. 4A–D, the beams 326 and 328 may be continuously or discontinuously applied to the medium or may be applied prior to one another or vice versa.

EXEMPLARY EMBODIMENTS OF THE WAVEGUIDE AND THE ACTIVE MEDIUM

Figure 5:
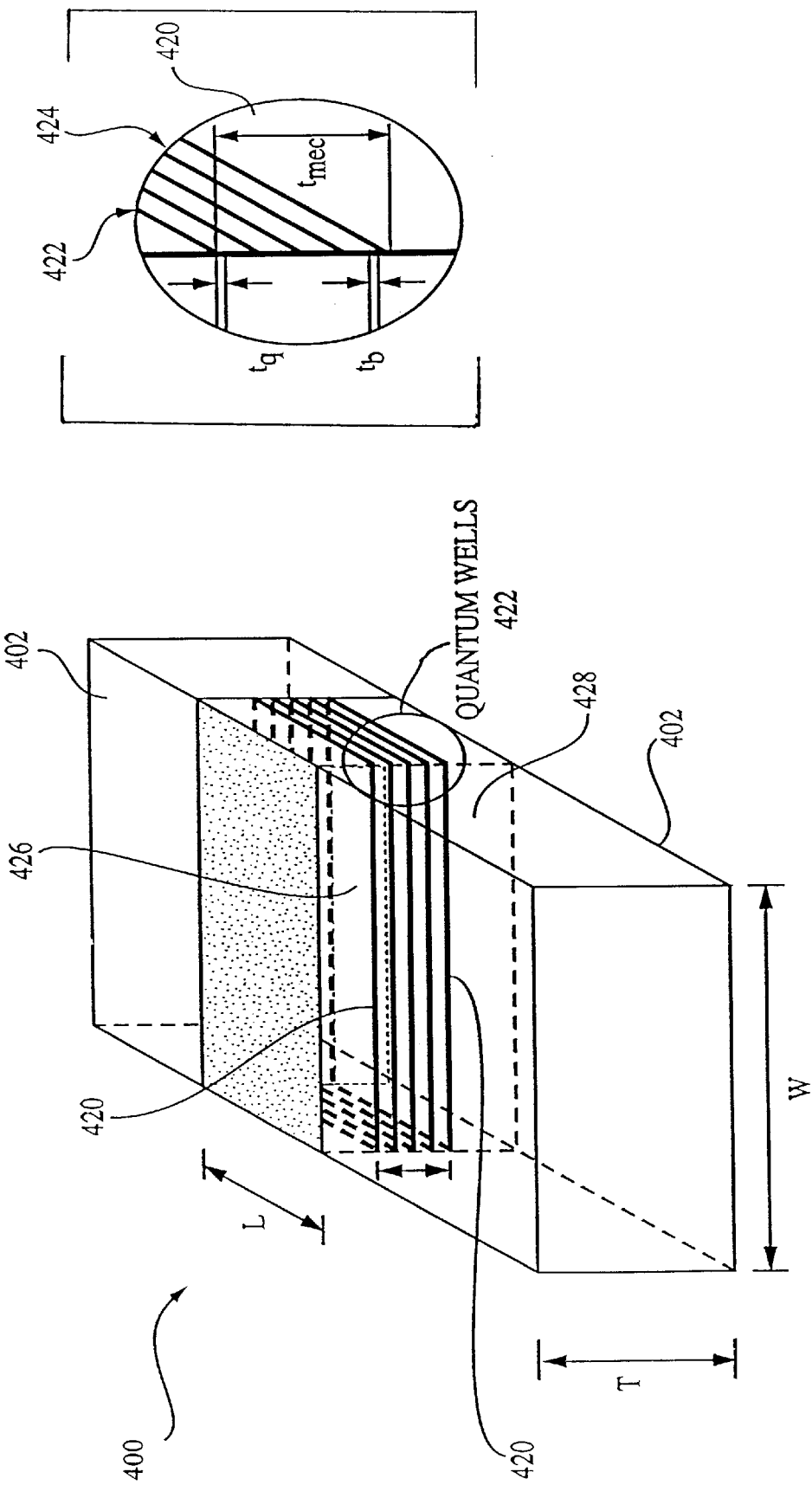
FIG. 5 illustrates an exemplary embodiment of a waveguide having an active medium made up of quantum wells.

FIG. 5 illustrates an exemplary embodiment of a waveguide 400 having an active medium 420. In this exemplary embodiment, the waveguide 400 has a width dimension of 0.4 micrometers ($\mu$m) and a thickness of 0.25 $\mu$m. The waveguide 400 is constructed of $Al_xGa_{1-x}As$ as a core material where the alloy composition x is equal to 0.3. The waveguide 400 is not limited to this core material and other materials appropriate for guided wave action as known to those skilled in the art can be used, for example Indium Gallium Arsenide Phosphide ($In_{1-x}Ga_xAs_{1-y}P_y$), Indium Phosphide (InP), Indium Aluminum Arsenide Phosphide compound semiconductors, and others. The waveguide core material thus has an approximate refractive index equivalent to n=3.4. As is known to those skilled in the art, this refractive index provides an effective propagating refractive index $n_{eff}$ of approximately 2.0 for a transverse magnetic wave with magnetic field polarization parallel to the waveguide width. The effective propagating refractive index $n_{eff}$ is basically related to the phase velocity V of light propagation along the waveguide via $$V = \frac{c}{n_{eff}},$$

where c is the speed of light in a vacuum.

It should be understood that the alloy composition x, and the resulting values are exemplary and the waveguide is not limited to this illustrative value.

The waveguide 400, as is known to those skilled in the art, can be fabricated on a substrate (not shown in FIG. 5) and/or be surrounded by a cladding material (not shown in FIG. 5). In a useful embodiment, the waveguide 400 sits above a low refractive index material and can be surrounded from the top and/or from the sides by a similar or equivalent low refractive index material. Some examples of such a low refractive index material are silicon dioxide $SiO_2$, or silicon nitride $Si_3N_4$, or a transparent conducting oxide, such as Indium Tin oxide or a semiconductor with a lower refractive index than the refractive index of the waveguide core. In the presently preferred embodiment, the waveguide 400 is surrounded with $SiO_2$ having refractive index n=1.5.

It should be understood that other waveguides, besides conventional waveguides with high-refractive index core surrounded by low refractive index cladding such as waveguide 400, can be utilized in phosistor embodiments including other types of waveguiding devices such as those based on repeated reflection via metal surface structures or photonic-bandgap structures.

In a presently preferred embodiment, the exemplary active medium 420 fills or occupies the center region of the $Al_xGa_{1-x}As$ waveguide 400 for a length L, illustrated in FIG. 5 as the gray shaded region of waveguide 400.

In a useful embodiment, and as illustrated in FIG. 5 the active medium is made up of five semiconductor quantum wells. The design, fabrication and use of multi-quantum well-structures in optical devices is well known to those skilled in the art.

FIG. 5 illustrates an exemplary embodiment of an active medium 420 of length L based on a multi-quantum well structure. The five quantum wells 422 are each formed of 10 nanometer ("nm") thick GaAs sandwiched by 10 nm thick $Al_xGa_{1-x}As$ barriers 424, where the alloy composition x is equal to 0.3. It should be understood that the alloy composition is not limited to this illustrative value. The total thickness for the quantum wells 422 and barrier layers 424 in this exemplary embodiment will be 0.09 micrometers or microns ($\mu$m). This thickness is well within the 0.25 $\mu$m thickness dimension of waveguide 400. The waveguide material 400, as illustrated in FIG. 5 serves as a top "layer" 426 and a bottom "layer" 428 of $Al_xGa_{1-x}As$ (x=0.3) for the active medium 420.

Calculations and derivations were performed based on this exemplary embodiment. As described in these calculations presented below, the five quantum wells will provide a gain coefficient of g=0.125 per $\mu$m when the medium 420 is excited for a particular operating wavelength, and a loss coefficient of about a=-g=0.5 per $\mu$m when the medium 420 is in a loss or absorption state for a particular operating wavelength. In this exemplary embodiment of the medium 420, the energy bandgap $E_{gap}$ of GaAs is at 870 nm, while the absorption wavelength of the quantum well is at around 820 nm.

It should be understood that while a presently preferred and useful embodiment of the phosistor active medium is a multi-quantum well structure utilizing semiconductor materials, it is not the only embodiment or medium that can be utilized. Other than semiconductor media, there are many other atomic, molecular, ionic, or low-dimensional electronic media, such as other quantum wells, quantum wires, or quantum dots, for example, that can satisfy the general requirements of the medium described and that are known to those skilled in the art.

Presented are calculations to obtain the gain coefficient g and the loss coefficient a along discussions of the switching energies and switching times for the active medium 420 for specific beam intensities for the various beams in the waveguide 400.

The basic elements in the active medium 420 are electron-hole pairs or excitons. Both can give rise to photon flux transfer operation.

The number of excitons in a GaAs semiconductor quantum well such as one of the wells 422 in FIG. 5 can be estimated by the material volume divided by the exciton area. The typical volume occupied by an exciton in bulk GaAs is about 0.0185 $\mu$m, giving an exciton occupation volume of $6.33 \times 10^{-6}$ $\mu m^3$. This corresponds to a densely packed density with exciton radius of about 0.013–0.014 $\mu$m. Hence in a 1 $\mu$m cubic volume, the number of excitons is about $1.6 \times 10^{-5}$. The exciton number density is $1.6 \times 10^{-5}/cm^3$. For the quantum well, the exciton radius can be about ⅓ to ½ of the well, giving an exciton density about 8 to 27 times higher.

The exciton emission width, or the spectral width of spontaneous emission from the GaAs quantum well exciton peak is about 0.3 nm. The dipole dephasing time is 1000 fsec (linewidth of 0.3 nm). The carrier decay time is 3 nsec, giving a linewidth broadening factor of about (1/F)=3000.

Next, the electron-hole decay is calculated. At room temperature, kT is about 25 meV. The optical energy is 0.264 atto-Joules (aJ), equal to $(0.264 \times 10^{-18}/1.602 \times 10^{-19}$ eV)= 1.65 eV. Thus the thermal energy corresponds to 11.4 nm. At room temperature, before the exciton has time to decay, the exciton has already dissolved into an electron-hole pair, which decays at a slower rate. For an electron-hole population decay rate of $\gamma_{sp}=0.333 \times 10^{-9}$/s and an optical angular frequency of $2.512 \times 10^{-15}$/s (at 0.75 $\mu$m), the intrinsic spectral linewidth of the electron hole is $(0.333 \times 10^{-9}/2.512 \times 10^{-15})*750=1 \times 10^{-4}$ nm. The dipole dephasing broadening factor is given by F, where $(1/F)=12/1 \times 10^{-4}=120000$. The dipole decay rate is $\gamma_V = \gamma_{sp}*(F/2)$.

Next, the saturation intensity can be calculated. For room temperature exciton, the saturation intensity with 300 fsec dephasing rate is given below.

$$I_{So} = \frac{\pi \hbar \omega n^2 2\gamma_V}{3\lambda_A^2} = \frac{\pi * 0.264 * 10^{-18} * (1/(1000*10^\wedge -15))}{3*(0.75*10^{-6}/3.4)^2} = 567 \text{ W/cm}^2$$

For the electron-hole plasma, the saturation intensity is given by:

$$I_{So} = \frac{\pi \hbar \omega n^2 2\gamma_V}{3\lambda_A^2} =$$

$$\frac{\pi * 0.264 * 10^{-18} * (0.33333 * 10^9 * 120000)}{3*(0.75*10^{-6}/3.4)^2} = 22692 \text{ W/cm}^2$$

Next, the exciton and electron-hole absorption coefficients can be determined. For an exciton, the absorption cross section is given by:

$$\sigma_0 = \frac{\hbar \omega \gamma_{sp}}{2 I_{So}} = \frac{0.264 * 10^{-18} * (1/3 * 10^{-9})}{2 * 567} = 8.8 * 10^{-14} \text{ m}^2$$

which can also be expressed as $$\sigma_0 = \frac{3F\lambda_A^2}{2\pi n^2}$$

$$\alpha_0 = N_e * \sigma_0 = 1.6 * 10^{\wedge}17 * 2.2 * 10^{\wedge} -12 = 1.4 * 10^{\wedge}4 / cm$$

Experimentally, the exciton absorption coefficient is about $2 \times 10^4$/cm. For electron-holes, the absorption cross section is given by:

$$N_e = 1.6 * 10^{17} * \frac{12 \text{ nm}}{0.5 \text{ nm}} = 3.84 * 10^{18}/cm^3$$

For an electron-hole density of $3.84 \times 10^{18}/cm^3$, calculated by:

$$\sigma_0 = \frac{\hbar \omega \gamma_{sp}}{2 I_{So}} = \frac{0.264 * 10^{-18} * (0.3333 * 10^9)}{2 * 22000} = 2 * 10^{-15} \text{ cm}^2$$

This gives an absorption coefficient of:

$$\alpha_0 = N_e * \sigma_0 = 7680/cm$$

Below, we take an absorption coefficient of about 10,000/cm or 1 per $\mu$m. As an example, suppose we have an active volume of approximately 1 $\mu$m by 0.4 $\mu$m by 0.2 $\mu$m (0.08 $\mu$m), and a carrier density of $3.84 \times 10^6/\mu m^3$ then the number of electron and holes will be $(0.08*3.84\times10^6)=0.307\times10^6$. This will require an energy of $0.264*10^{\wedge}-18*1.84*10^{\wedge}6=8.1*10^{\wedge}-14$ Joule (J) or 81 femtojoules. For 3 nsec, it will be 27 µW. For 3 psec pulses, it will be 27 mW and 1 psec pulses, it will be 71 mW.

On the other hand, the saturation intensity of 22700 W $cm^{\wedge}2$ can be achieved with an optical power of 17 µW in a waveguide area of 0.08 µm². To get full inversion, we need two times the saturation power, which will be 34 µW, agreeing with the above value of about 27 µW.

With use of exciton absorption, the situation can be improved. In that case, the carrier density is $1.6*10^{\wedge}5$ per µm. The number of electron and holes in 0.5 µm by 0.2 µm by 0.8 µm volume will be $0.08*1.6*10^{\wedge}5=0.64*10^{\wedge}14$. This will require an energy of $0.264*10^{\wedge}-18*1.28*10^{\wedge}4=1.685*10^{\wedge}-15$ J. For 3 nsec pulse, the required peak power will be 0.56 µW. For 3 psec, it will be 0.56 mW. For 1 psec, it will be 1.68 mW, which is about 20 times smaller than that of the electron-hole case.

Experimental transparency is achieved with 40 mW power at 15 µm region or 22 KW/cm^2 at a carrier density of about $2*10^{\wedge}18$ per cm^2. This assumes a decay rate of 3.4 nsec. Thus for 3 nsec, the power needed in the waveguide will be 16 µW, giving for 3 psec switching, a power of about 16 mW. Again, agreeing with above.

From these, suppose the coupling length is 15 µm, we see that for gL=1, the switching power will be 16 mW for 3 psec. The typical device here requires gL=2 (for 7.5 µm gain medium) to gL>-6 (for 15 µm absorbing medium). Because of upperband filling, the gain achieved at the expected carrier number density is about 0.25 of the expected (or about 0.25 per pizz).

An example of a device based on gL=1 gain medium will be a five quantum well device (0.05 µm thick) at the center of the 0.2 µm thick medium with 7.5 µm long length, giving a gain of gL=(¼)(from 0.25 per µm)*(¼)(from thickness ratio)*2 (from 2×enhancement at center of medium)*7.5 (from length)=1. The expected 100 psec (3 psec) switching peak power will be 1 mW (32 mW) or about 100 fJ.

An example of a device based on gL>-6 absorbing medium will be a five quantum well device (0.03 µm thick) at the center of the 0.2 µm thick medium with 7.5 µm long length, giving a gain of gL=-(1)(from 1 per µm)*(¼)(from thickness ratio)*2 (from 2×enhancement at center of medium)*15 (from length)=-7.5. The expected 100 psec (3 psec) switching peak power will be 2 mW (64 mW) or about 200 femto-Joules.

With use of excitonic absorption, the switching energy can be below 10 fJ to as low as 1 fJ when optimized (if the absorption peak is 4 per µm and the waveguide is 2 times smaller). The narrow 0.5 nm width of the exciton peak, however, restricts the speed to slower than 3 psec (11 nm for 150 fesc).

From the above calculations, it can be seen that the energy needed for the gain or loss gate operation is hundreds of femto-Joules (fJ) or less.

SPECIFIC DEVICE EXAMPLES

The presently preferred phosistor embodiments and devices may be classified by whether they convert a higher energy (lower wavelength) pulse to a lower energy (higher wavelength) pulse or vice versa, or do not convert the pulse energy at all.

In most cases under discussion, light having wavelength $\lambda_n$ is input to the phosistor either (1) in a continuous fashion with respect to time, that is, as continuous wave (CW) light having wavelength $\lambda_n$ or (2) in a switched, or pulsed fashion with respect to time, so that pulsed light having wavelength $\lambda_n$ is present for the duration of the pulse, and is not present otherwise (at least not at wavelength $\lambda_n$. Such a characterization of light will be familiar to those skilled in the art. Hereafter, for simplicity of description, light or another entity "having wavelength $\lambda_n$" can be referred to as being "at $\lambda_n$."

These phosistors are also classified by their physical principles of operation. Like transistors, a phosistor can have three or more "terminals". A phosistor can involve a wave-coupling junction such as a directional coupler, or a multi-mode interference (MMI) device or a photonic bandgap structure. There are many ways to achieve a wave-coupling effect. One way is through coupled waveguides. Another way is through a multi-mode interference (MMI) device. There are also numerous ways to confine waves. One way is through an waveguide and another way is through a photonic bandgap device. Regardless, it should be understood that the phosistor devices and exemplary embodiments described herein use a combination of means to resist or enhance the flow of photon flux in a certain direction by turning on and off an interference pathway via the action of another photon flux on the medium. An interference pathway determines the propagation direction of the flow of photon flux in the photon transistor(s).

A coupler device transfers energy from one material region to another via interference. This interference causes the propagation direction of an input photon beam to deviate from straight line propagation. In a phosistor, this path-changing interference is being interrupted in the coupler due to an absorbing or a gain medium controlled by another photon flux, which leads to an effective "transfer photon-resistance" for the spatial propagation of the original photon beam by enhancing or reducing the resultant energy flux in certain regions of the coupler.

Presented herein are presently preferred and useful embodiments of phosistor devices utilizing directional coupled waveguides in the form of waveguide 400. In some instances one or more arm of the directionally coupled waveguides will have an active region or medium in the form of active medium 420. The coupler length, defined as the length to achieve full energy transfer from one waveguide to another, of the directional coupler involved will be denoted as $l_C$.

It should be understood that other waveguides, besides conventional waveguides with high-refractive index core surrounded by low refractive index cladding such as waveguide 400, can be utilized in phosistor embodiments including other types of waveguiding devices such as those based on repeated reflection via metal surface structures or photonic-bandgap structures.

Figure 6A:
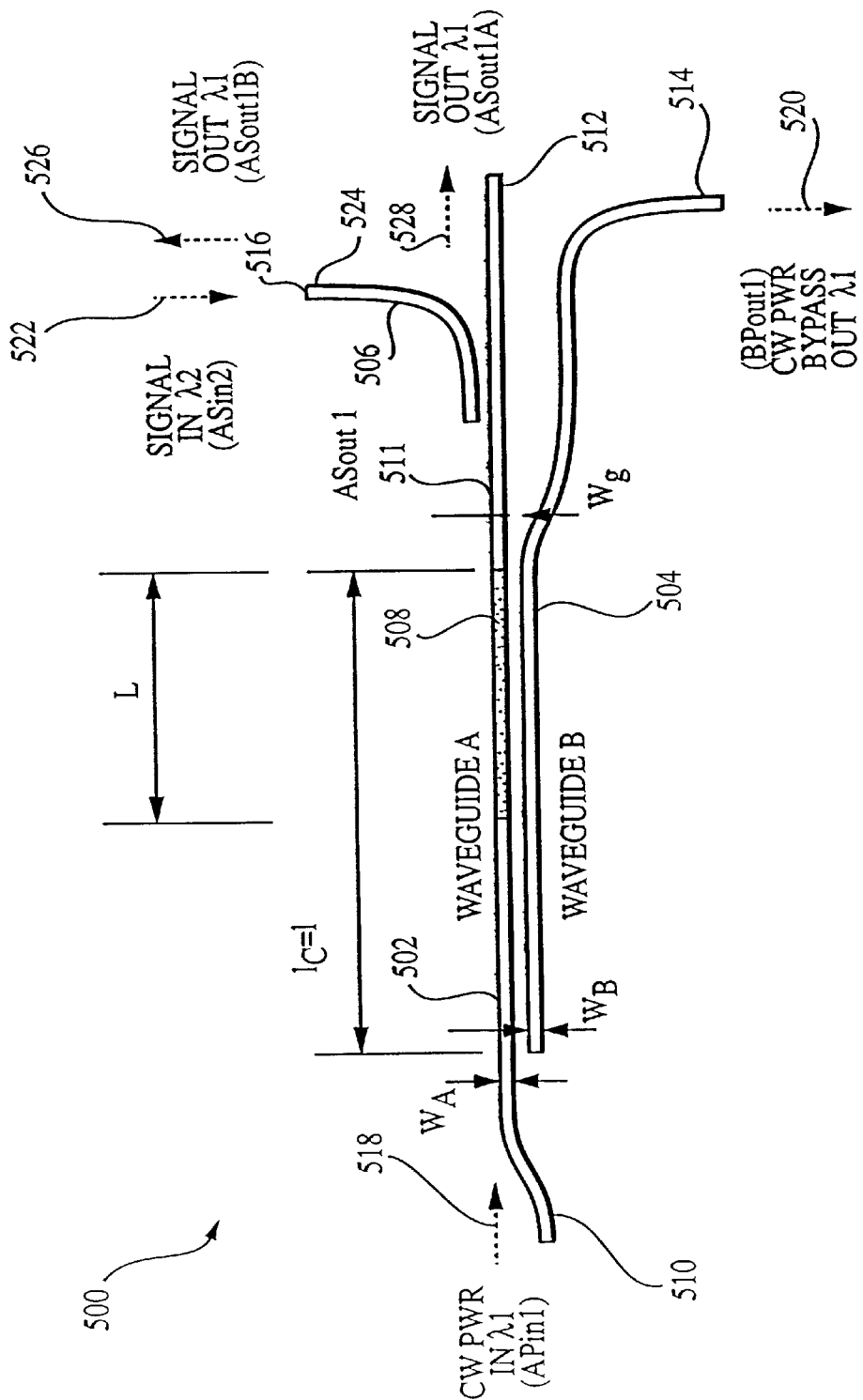
FIG. 6A illustrates a first embodiment of a phosistor logic gate utilizing directionally coupled waveguides.

Exemplary Device 1:

FIG. 6A illustrates a first general embodiment 500 of a phosistor device employing directionally coupled waveguides. The device can perform as a switching element and can in particular switch or convert a stream of ultrafast (picosecond, femtosecond) optical pulses at high energy and low wavelength to a stream of ultrafast optical pulses at comparatively low energy (comparatively high wavelength). The device can be referred to as an "Ultrafast Input-Arm-Gain-Gate High-to-Low-Energy Phosistor" (IGHL Phosistor 500).

IGHL Phosistor 500 includes a first Waveguide A 502 and a second Waveguide B 504. A third Waveguide 506 is included in Phosistor 500 for coupling an input optical pulse to the Waveguide A 502, but which is otherwise not central to the operation of Phosistor 500. The Waveguide A 502 includes an active medium 508, which is illustrated as a gray region in FIG. 6A. As described above, Waveguide A 502 can be implemented as waveguide 400 with active medium 420 in a useful embodiment. The Waveguide A 502 includes an input port APin1 510 and an output port ASout1a 512. The Waveguide B 504 includes an output port BPout1 514. The third Waveguide 506 includes an input port ASin2 516 which doubles as an output port ASout1b 524.

For the input port labeled "APin1" (510), "P" stands for Power-Supply beam, "A" refers to Waveguide A 502, "in" refers to 510 being an input port, and "1" refers to the input wavelength being $\lambda_1$.

For the output port labeled "ASout1a" (512), "S" stands for Signal beam, "A" refers to Waveguide A 502, "out" refers to it being an output port, "1" refers to the input wavelength being $\lambda_1$, and "a" is used to distinguish this port 512 which is along Waveguide A 502.

For the output port labeled "ASout1b" (524), "S" stands for Signal beam, "A" refers to Waveguide A 502, "out" refers to it being an output port, "1" refers to the input wavelength being $\lambda_1$, and "b" is used to distinguish this port 524 which is along Waveguide 506.

For the output port labeled "BPout1" (514), "P" stands for Power-Supply beam, "B" refers to Waveguide B 504, "out" refers to it being an output port, and "1" refers to the input wavelength being $\lambda_1$.

For the input port labeled "ASin2" (516), "S" stands for Signal beam, "A" refers to Waveguide A 502, "in" refers to it being an input port, and "2" refers to the input wavelength being $\lambda_2$.

Continuous wave (CW) light having wavelength $\lambda_1$ (at $\lambda_1$) (CW PWR IN $\lambda_1$) 518 enters at the port APin1 510 on the Waveguide A 502. The CW light at $\lambda_1$ 518 propagates along the Waveguide A 502 and is subsequently transferred to Waveguide B 504 after a coupling length $l_C$. The coupling length is defined as the length at which a wave in one waveguide fully couples into another waveguide coupled to the first waveguide. In this device 500, the interaction length l, defined as the length of interaction between Waveguides A 502 and B 504 extends to the full coupling length $l_C$ so that $l=l_C$. In FIG. 6A, $l_C$ is shown to be 15 µm. The CW light at $\lambda_1$ 518 then exits from Waveguide B 504 at the port BPout1 514 as continuous wave (CW) light at $\lambda_1$ (CW PWR BYPASS OUT $\lambda_1$) 520.

The input port ASin2 516 on Waveguide 506 effectively serves as another input port of Waveguide A 502, and is the input signal port for pulsed light having wavelength $\lambda_2$ (SIGNAL IN $\lambda_2$) 522. The pulsed light $\lambda_2$ 522 entering the port ASin2 516 will excite the active medium 508, providing gain at the operating wavelength $\lambda_1$ to the active medium 508 in the gray area of Waveguide A 502. This state of the active medium 508 is analogous to Case B, as illustrated in FIG. 4B.

The CW light at $\lambda_1$ 518 from input port APin1 510 gains energy in the active medium 508 and this extra energy is propagated towards ports ASout1a 512 and ASout1b 524, and will exit port ASout1a 512. If the coupling of energy from the port ASin2/ASout1b 516/524 to Waveguide A 502 is a 50/50 coupler, then about 50 percent of $\lambda_1$ 526 (SIGNAL OUT $\lambda_1$) will go to port ASin2/ASout1b 516/524 and 50 percent of $\lambda_1$ 528 (SIGNAL OUT $\lambda_1$) will go to port ASout1a 512.

In the case of FIG. 6A the net effect is that the pulsed light at $\lambda_2$ 522 into port ASin2 516 generates a pulsed light at $\lambda_1$ 528 exiting port ASout1a 512 and a pulsed light at $\lambda_1$ 526 exiting port ASout1b 524. While not essential for the basic operation of the device 500, an improved version 550 of the device 500 can be achieved via using a frequency-selective coupler such as grating or a small resonator. Such a frequency dependent coupler is called a dichroic filter or coupler and is shown as part of device 550 in FIG. 6B, replacing Waveguide 506 of FIG. 6A. The dichroic filter 556 will couple the pulsed light $\lambda_2$ 572 entering the port ASin2 566 to Waveguide A 502 but not $\lambda_1$. In this case, $\lambda_1$ (SIGNAL OUT $\lambda_1$) 578 will not couple from Waveguide A 502 to the port ASin2 566 either and will instead propagate all its energy to port ASout1 562. It should be understood that the device 550 is otherwise functionally and operationally identical to the device 500 and description and comments relating to the device 500 are applicable to device 550.

In an exemplary embodiment, the wavelength $\lambda_1$ can be at 820 nm, $\lambda_2$ can be at 800 nm, and the Waveguide A 502 can be implemented as the $Al_xGa_{1-x}As$ Waveguide 400, illustrated in FIG. 5, and having alloy composition x at 0.3 giving a bandgap energy of around 690 nm. Thus the core material is transparent at the wavelength $\lambda_1$ of 820 nm. As shown in FIG. 5, the cross-sectional dimensions of the waveguide 400 can be 0.4 µm wide by 0.25 µm thick. FIG. 6A illustrates that Waveguide A 502 is 0.4 µm wide and is located at an approximately parallel distance from Waveguide B 504 of 0.4 µm.

As described above, Waveguide A 502 can be implemented as waveguide 400 with active medium 420 (See FIG. 5) in a useful embodiment. As shown in FIG. 6A, the length L of the active medium 508 is about half the coupling length $$l_C \left( L \cong \frac{l_C}{2} \right).$$

The length L of the active medium 508 may be somewhat longer or shorter than half of $l_C$. Varying the length L of the active medium 508 relative to the coupling length $l_C$ will vary the input to output signal conversion efficiency.

It should be understood that the energy exiting the port BPout1 514 (as continuous wave (CW) light at $\lambda_1$ (CW PWR BYPASS OUT $\lambda_1$) 520) can be designed to be largely unaffected, in particular not reduced at all, in this entire process. This is an interesting property of the IGHL Phosistor 500; 550 of FIGS. 6A and 6B that the energy exiting the port BPout1 514 can be reused to power another phosistor. This feature is analogous to the supply voltage in electronic logic and switching circuitry.

In should be understood that in the typical operation of Phosistors 500; 550 light can be continuous wave (CW) light, but the light can otherwise be a pulsed light in some specific applications. For the purpose of illustration and not limitation it is taken as CW light.

It should be understood that the speed of switching can be fast as the active medium 508 when in the gain state at $\lambda_1$ (Case B in FIG. 4B) will be driven back to the transparency state at $\lambda_1$ (Case C in FIG. 4C) rapidly by the light at $\lambda_1$ 518 passing through the gain medium 508 when pulsed light at $\lambda_2$ 522; 572 is removed. The state of the active medium 508 is again analogous to case C, as illustrated in FIG. 4C.

The pulsed light at $\lambda_2$ 522 entering the port ASin2 516 will excite the active medium 508, providing gain at the operating wavelength $\lambda_1$ to the active medium 508 in the gray area of Waveguide A 502.

Figure 6B:
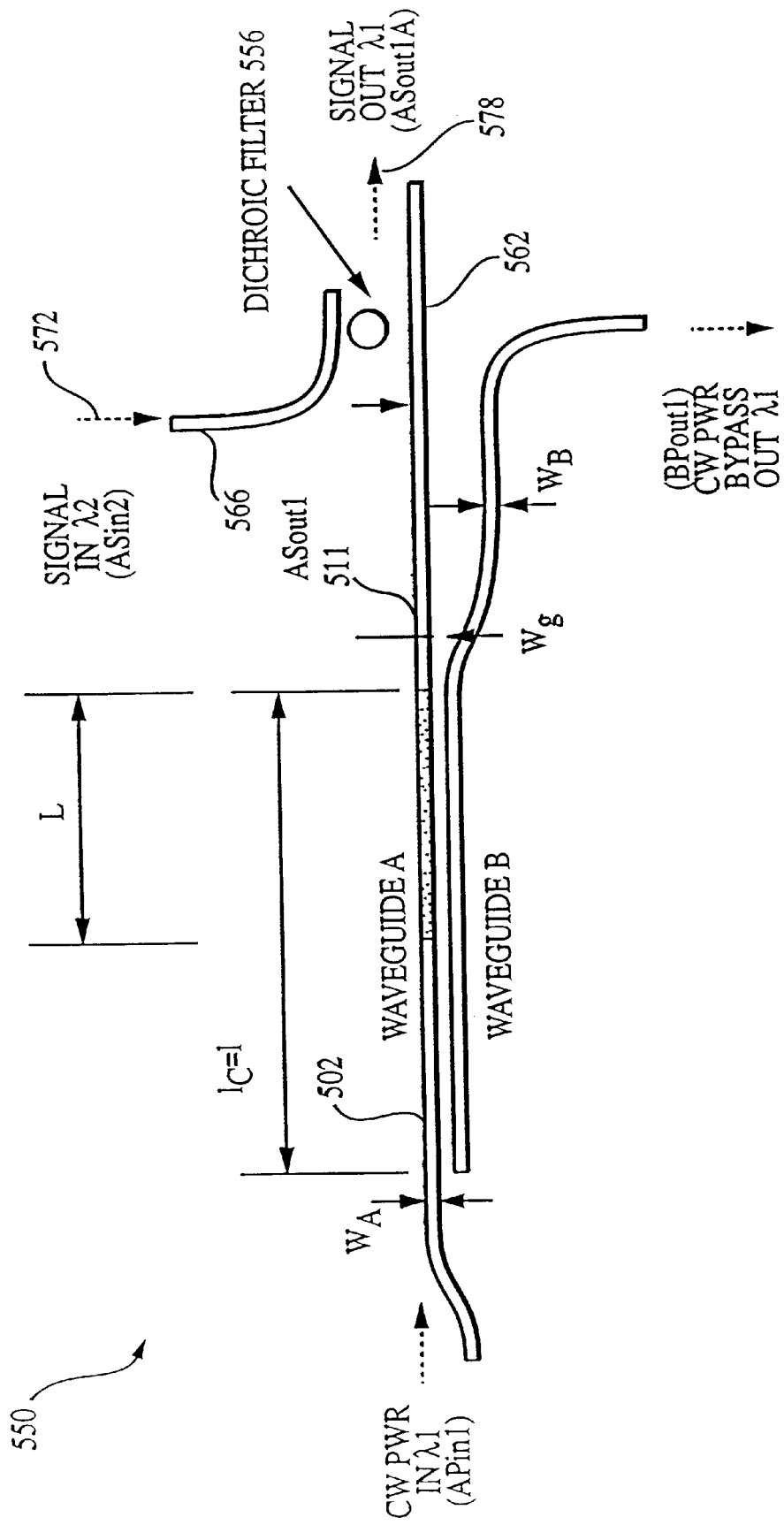
FIG. 6B illustrates the first embodiment of a phosistor logic gate utilizing directionally coupled waveguides and a dichroic filter.

It should be understood that the pulsed light at $\lambda_2$ 522, 572 can be input to the active medium 508 on Waveguide A 502 in any manner of implementation, in addition to the input structures 506 and 556 described in FIGS. 6A and 6B.

Since the active medium 508 of devices 500; 550 of FIGS. 6A and 6B is operated at the gain mode, we say that this phosistor has a "gain gate". This gate is in the input arm (Waveguide A 502).

The number of electrons excited in the active medium 508 would be approximately equal to the number of photons from the pulsed light at $\lambda_2$ absorbed by the medium 508. Likewise, the number of photons generated at $\lambda_1$ and propagated toward the output port(s) of Waveguide A 502 would be approximately equal to the number of electrons excited, if the photons are generated at $\lambda_1$ before the free decay of the electrons which takes place at nanosecond time scale (for semiconductor medium). As a result, the number of photons out at $\lambda_1$ would be nearly equal to (i.e. correlated to) the number of photons in at $\lambda_2$ if the medium 508 fully absorbed the photons at $\lambda_2$. This is called quantum-number correlation and is yet another interesting property exhibited by the devices 500; 550. When that happens, the devices 500; 550 can be used as high or near unity quantum efficiency devices. The net action of the exemplary devices 500; 550 is to translate a beam of photons to a longer wavelength. Hence, this device can act as a quantum-number correlated wavelength up shifter, for example.

Figure 7:
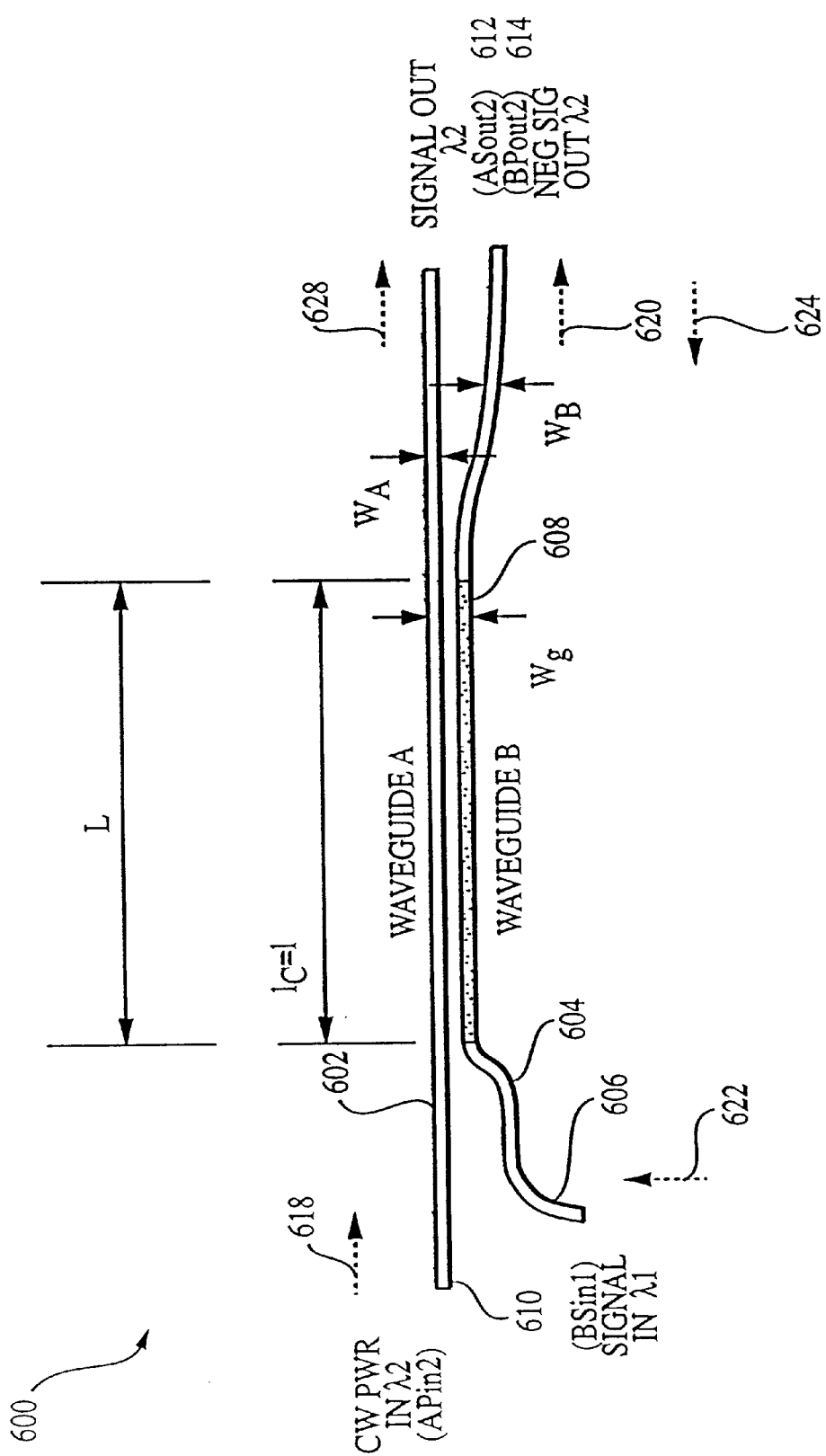
FIG. 7 illustrates a second embodiment of a phosistor logic gate utilizing directionally coupled waveguides.

Exemplary Device 2:

FIG. 7 illustrates a second general embodiment 600 of a phosistor device employing directionally coupled waveguides. The device can perform as a switching element and can in particular switch or convert a stream of ultrafast (picosecond, femtosecond) optical pulses at low energy and high wavelength to a stream of ultrafast optical pulses at comparatively high energy (comparatively low wavelength). The device can be referred to as an "Ultrafast Output-Arm-Loss-Gate Low-to-High-Energy Inversion Phosistor" (OLLH Phosistor 600).

OLLH Phosistor 600 includes a first Waveguide A 602 and a second Waveguide B 604. The Waveguide B 604 includes an active medium 608, which is illustrated as a gray region in FIG. 7. As described above, Waveguide B 604 can be implemented as waveguide 400 with active medium 420 in a useful embodiment. The Waveguide A 602 includes an input port APin2 610 and an output port ASout2 612. The Waveguide B 604 includes an input port BSin1 606 and an output port BPout2 614 which doubles as a possible input port (not shown in FIG. 7).

For the input port labeled "APin2" (610), "P" stands for Power-Supply beam, "A" refers to Waveguide A 602, "in" refers to 610 being an input port, and "2" refers to the input wavelength being $\lambda_2$.

For the output port labeled "ASout2" (612), "S" stands for Signal beam, "A" refers to Waveguide A 602, "out" refers to it being an output port, "2" refers to the input wavelength being $\lambda_2$.

For the input port labeled "BSin1" (606), "S" stands for Signal beam, "B" refers to Waveguide B 604, "in" refers to 606 being an input port, and "1" refers to the input wavelength being $\lambda_1$.

For the output port labeled "BPout2" (614), "P" stands for Power-Supply beam, "B" refers to Waveguide B 604, "out" refers to it being an output port, and "2" refers to the input wavelength being $\lambda_2$.

Continuous wave (CW) light having wavelength $\lambda_2$ (at $\lambda_2$) (CW PWR IN $\lambda_2$) 618 enters at the port APin2 610 on the Waveguide A 602. The CW light at $\lambda_2$ 618 propagates along the Waveguide A 602 and is subsequently transferred to Waveguide B 604 after a coupling length $l_C$. The coupling length is defined as the length at which a wave in one waveguide fully couples into another waveguide coupled to the first waveguide. In this device 600, the interaction length l, defined as the length of interaction between Waveguides A 602 and B 604, is equal to the full coupling length $l_C$ so that $l=l_C$. In FIG. 7, $l_C$ and l are shown to be 15 $\mu$m. The CW light at $\lambda_2$ 618 then exits from Waveguide B 604 at the port BPout2 614 as light at $\lambda_2$ (NEG SIG OUT $\lambda_2$) 620. As the portion of CW light at $\lambda_2$ 618 propagates across the active medium 608, it drives the active medium 608 to a state of transparency at $\lambda_2$. The intensity of $\lambda_2$ must be high enough so that $I_2 > (1/\eta)I_{2Sat}$. That is, the intensity of the light at $\lambda_2$ must exceed the saturation intensity divided by $\eta$, the effective percentage of leakage power to the Waveguide B 604 when there is no pulsed light at $\lambda_1$ 622 entering the port BSin1 606 (i.e., an input off state). This state of the active medium 608 is analogous to Case D, as illustrated in FIG. 4D.

The input port BSin1 606 on Waveguide B 604 is the input signal port for pulsed light having wavelength $\lambda_1$ (SIGNAL IN $\lambda_1$) 622. The pulsed light $\lambda_1$ 622 entering the port BSin1 606 will de-excite or relax the active medium 608, providing loss at the operating wavelength $\lambda_2$ to the active medium 608 in the gray area of Waveguide B 604. This state of the active medium 608 is analogous to Case C, as illustrated in FIG. 4C.

The CW light at $\lambda_2$ 618 from input port APin2 610 loses energy in the active medium 608 so that the CW light at $\lambda_2$ 618 does not transfer to Waveguide B 604 and thus does not exit from the output on BPout2 614. Rather, the CW light at $\lambda_2$ 618 propagates through Waveguide A 602 and exits out of output port ASout2 612 as a pulse of light at $\lambda_2$ (SIGNAL OUT $\lambda_2$) 628 out of the first Waveguide A 602 and effectively becomes zero when a pulse of light at $\lambda_1$ 622 is present.

In the case of FIG. 7 the net effect is that the pulsed light at $\lambda_1$ 622 into port BSin1 606 generates a pulse of light at $\lambda_2$ 628 exiting port ASout2 612.

In an exemplary embodiment, the wavelength $\lambda_1$ can be at 820 nm, $\lambda_2$ can be at 800 nm, and the Waveguide A 602 can be implemented as the $Al_xGa_{1-x}As$ Waveguide 400, illustrated in FIG. 5, and having alloy composition x at 0.3 giving a bandgap energy of around 690 nm. Thus the core material is transparent at the wavelength $\lambda_2$ of 800 nm. As shown in FIG. 5, the cross-sectional dimensions of the waveguide 400 can be 0.4 $\mu$m wide by 0.25 $\mu$m thick. FIG. 7 illustrates that Waveguide A 602 is 0.4 $\mu$m wide and is located at an approximately parallel distance from Waveguide B 604 of 0.4 $\mu$m.

As described above, Waveguide A 602 can be implemented as waveguide 400 with active medium 420 (See FIG. 5) in a useful embodiment. As shown in FIG. 7, the length L of the active medium 608 is equal to the coupling length $l_C$ (L=$l_C$). The length L of the active medium 608 may be somewhat longer or shorter than $l_C$. Varying the length L of the active medium 608 relative to the coupling length $l_C$ will vary the input to output signal conversion efficiency.

In should be understood that in the typical operation of Phosistors 600 light can be continuous wave (CW) light, but the light can otherwise be a pulsed light in some specific applications. For the purpose of illustration and not limitation it is taken as CW light.

The phosistor device 600 is capable of providing photon gain. This is due to the fact that a light pulse at $\lambda$, signal will create an output pulse having an increased number of photons. This increase can be quite significant.

It should be understood that the speed of switching can be fast as the active medium 608, when in the loss state at $\lambda_2$ (Case C, in FIG. 4C), will be driven back to the transparency state at $\lambda_2$ (Case D in FIG. 4D) rapidly by the light at $\lambda_2$ 618 passing through the loss or absorbing medium 608 when pulsed light at $\lambda_1$ 622 is removed. The state of the active medium 608 is again analogous to Case D, as illustrated in FIG. 4D.

The pulsed light at $\lambda_1$ 622 entering the port BSin1 606 will de-excite the active medium 608, providing loss at the operating wavelength $\lambda_2$ to the active medium 608 in the gray area of Waveguide B 604.

It should be understood that the pulsed light at $\lambda_1$ 622 can be input to the active medium 608 on Waveguide B 604 in any manner of implementation. In particular, the pulsed light at $\lambda_1$ 622 can enter either input port BSin1 606 or output port BPout2 614 which doubles as a possible input port (not shown in FIG. 7). The problem of any mixing of light that might occur can be addressed with use of a dichroic filter of coupler (not shown).

Since the active medium 608 of device 600 of FIG. 7 is operated at the absorbing or loss mode, we say that this phosistor has a "loss gate". This gate is in the output arm (Waveguide B 604).

Figure 8A:
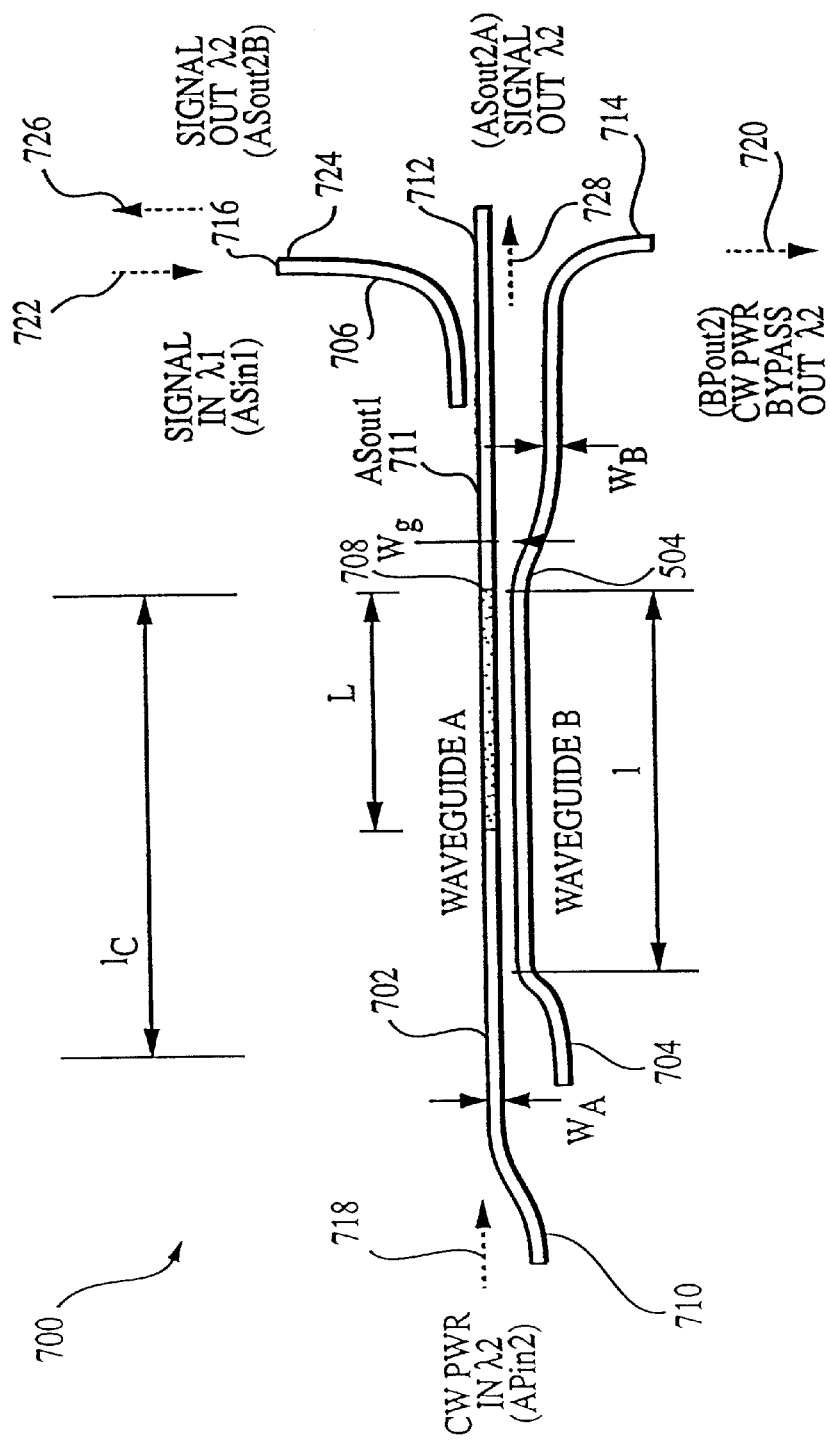
FIG. 8A illustrates a third embodiment of a phosistor logic gate utilizing directionally coupled waveguides.

Exemplary Device 3:

FIG. 8A illustrates a first embodiment 700 of a phosistor device employing directionally coupled waveguides. The device can perform as a switching element and can in particular switch or convert a stream of ultrafast (picosecond, femtosecond) optical pulses at low energy and high wavelength to a stream of ultrafast optical pulses at comparatively high energy (comparatively low wavelength). The device can be referred to as an "Ultrafast Input-Arm-Loss-Gate Low-to-High-Energy Inversion Phosistor" (ILLH Phosistor 700).

ILLH Phosistor 700 includes a first Waveguide A 702 and a second Waveguide B 704. A third Waveguide 706 is included in Phosistor 700 for coupling an input optical pulse to the Waveguide A 702 but which is otherwise not central to the operation of Phosistor 700. The Waveguide A 702 includes an active medium 708, which is illustrated as a gray region in FIG. 8A. As described above, Waveguide A 702 can be implemented as waveguide 400 with active medium 420 in a useful embodiment. The Waveguide A 702 includes an input port APin2 710 and an output port ASout2a 712. The Waveguide B 704 includes an output port Bpout2 714. The third Waveguide 706 includes an input port ASin1 716 which doubles as an output port ASout2b 724.

For the input port labeled "APin2" (710), "P" stands for Power-Supply beam, "A" refers to Waveguide A 702, "in" refers to 710 being an input port, and "2" refers to the input wavelength being $\lambda_2$.

For the output port labeled "ASout2a" (712), "S" stands for Signal beam, "A" refers to Waveguide A 702, "out" refers to it being an output port, "2" refers to the input wavelength being $\lambda_2$, and "a" is used to distinguish this port 712 which is along Waveguide A 702.

For the output port labeled "ASout2b" (724), "S" stands for Signal beam, "A" refers to Waveguide A 702, "out" refers to it being an output port, "2" refers to the input wavelength being $\lambda_2$, and "b" is used to distinguish this port 724 which is along Waveguide 706.

For the output port labeled "BPout2" (714), "P" stands for Power-Supply beam, "B" refers to Waveguide B 704, "out" refers to it being an output port, and "2" refers to the input wavelength being $\lambda_2$.

For the input port labeled "ASin1" (716), "S" stands for Signal beam, "A" refers to Waveguide A 702, "in" refers to it being an input port, and "1" refers to the input wavelength being $\lambda_1$.

Continuous wave (CW) light having wavelength $\lambda_2$ (at $\lambda_2$) (CW PWR IN $\lambda_2$) 718 enters at the port APin2 710 on the Waveguide A 702. The CW light at $\lambda_2$ 718 propagates along the Waveguide A 702 and is subsequently transferred to Waveguide B 704 after a coupling length $l_C$. The coupling length is defined as the length at which a wave in one waveguide fully couples into another waveguide coupled to the first waveguide. In this device 700, the interaction length l, defined as the length of interaction between Waveguides A 702 and B 704, is less than the full coupling length $l_C$ so that $l<l_c$. In FIG. 8A, the Waveguide B 704 is shown extending less than the full coupling length, although Waveguide A 702 could equally as well have been shortened relative to the full coupling length. In FIG. 8A, $l_C$ is shown to be 15 $\mu$m and l is shown to be 12 $\mu$m, so that $l<l_c$. The CW light at $\lambda_2$ 718 then exits from Waveguide B 704 at the port BPout2 714 as continuous wave (CW) light at $\lambda_2$ (CW PWR BYPASS OUT $\lambda_2$) 720. Since ($l<l_c$, some portion CW light at $\lambda_2$ 718 still propagates along the Waveguide A 702 (and the active medium 708) and exits the Waveguide A 702 at $\lambda_2$ 728 (SIGNAL OUT $\lambda_2$) at port ASout2a 712. As the portion of CW light at $\lambda_2$ 718 propagates across the active medium 708, the portion of CW light at $\lambda_2$ 718 drives the active medium 708 to a state of transparency at $\lambda_2$. This state of the active medium 708 is analogous to Case D, as illustrated in FIG. 4D.

The portion of CW light at $\lambda_2$ 718 propagates across the active medium 708 and propagates towards ports ASout2a 712 and ASout2b 724, and will exit port ASout2a 712. If the coupling of energy from the port ASin1/ASout2b 716/724 to Waveguide A 702 is a 50/50 coupler, then about 50 percent of $\lambda_2$ 726 (SIGNAL OUT $\lambda_2$) will go to port ASin1/ASout2b 716/724 and 50 percent of $\lambda_2$ 728 (SIGNAL OUT $\lambda_2$) will go to port ASout2a 712.

The input port ASin1 716 on Waveguide 706 effectively serves as another input port of Waveguide A 702, and is the input signal port for pulsed light having wavelength $\lambda_1$ (SIGNAL IN $\lambda_1$) 722. The pulsed light $\lambda_1$ 722 entering the port ASin1 716 will de-excite or relax the active medium 708, providing loss at the operating wavelength $\lambda_2$ to the active medium 708 in the gray area of Waveguide A 702. This state of the active medium 708 is analogous to Case C, as illustrated in FIG. 4C.

The CW light at $\lambda_2$ 718 from input port APin2 710 loses energy in the active medium 708 so that the portion of CW light at $\lambda_2$ 718 no longer propagates out of the active medium 708 and thus no longer propagates towards the ports ASout2a 712 and ASout2b 724. All signals at $\lambda_2$ (SIGNAL OUT $\lambda_2$ 726; SIGNAL OUT $\lambda_2$ 728) out of the first Waveguide A 702 effectively become zero when a pulsed of light at $\lambda_1$ 722 is present.

In the case of FIG. 8A the net effect is that the pulsed light at $\lambda_1$ 722 into port ASin1 716 generates a zero signal pulse of light at $\lambda_2$ 726 exiting port ASin1 716 and a zero signal pulse of light at $\lambda_2$ 728 exiting port ASout2a 712. While not essential for the basic operation of the device 700, an improved version 750 of the device 700 can be achieved via using a frequency-selective coupler such as grating or a small resonator. Such a frequency dependent coupler is called a dichroic filter or coupler and is shown as part of device 750 in FIG. 8B, replacing Waveguide 706 of FIG. 8A. The dichroic filter 756 will couple the pulsed light $\lambda_1$ 772 entering the port ASin1 766 to Waveguide A 702 but not $\lambda_2$. In this case, $\lambda_2$ (SIGNAL OUT $\lambda_2$) 778 will not couple from Waveguide A 702 to the port ASin1 766 either and will instead propagate all its energy to port ASout2 762. It should be understood that the device 750 is otherwise functionally and operationally identical to the device 700 and description and comments relating to the device 700 are applicable to device 750.

In an exemplary embodiment, the wavelength $\lambda_1$ can be at 820 nm, $\lambda_2$ can be at 800 nm, and the Waveguide A 702 can be implemented as the $Al_xGa_{1-x}As$ Waveguide 400, illustrated in FIG. 5, and having alloy composition x at 0.3 giving a bandgap energy of around 690 nm. Thus the core material is transparent at the wavelength $\lambda_2$ of 800 nm. As shown in FIG. 5, the cross-sectional dimensions of the waveguide 400 can be 0.4 μm wide by 0.25 μm thick. FIG. 8A illustrates that Waveguide A 702 is 0.4 μm wide and is located at an approximately parallel distance from Waveguide B 704 of 0.4 μm.

As described above, Waveguide A 702 can be implemented as waveguide 400 with active medium 420 (See FIG. 5) in a useful embodiment. As shown in FIG. 8A, the length L of the active medium 708 is about half the coupling length $$l_C\left(L \cong \frac{l_C}{2}\right).$$

The length L of the active medium 708 may be somewhat longer or shorter than half of $l_C$. Varying the length L of the active medium 708 relative to the coupling length $l_C$ will vary the input to output signal conversion efficiency.

It should be understood that the energy exiting the port BPout2 714 (as continuous wave (CW) light at $\lambda_2$ (CW PWR BYPASS OUT $\lambda_2$) 720 can be designed to be largely unaffected, in particular not reduced at all, in this entire process. This is an interesting property of the ILLH Phosistor 700; 750 of FIGS. 8A and 8B that the energy exiting the port BPout2 714 can be reused to power another phosistor. This feature is analogous to the supply voltage in electronic logic and switching circuitry.

In should be understood that in the typical operation of Phosistors 700; 750 light can be continuous wave (CW) light, but the light can otherwise be a pulsed light in some specific applications. For the purpose of illustration and not limitation it is taken as CW light.

It should be understood that the speed of switching can be fast as the active medium 708 when in the loss state at $\lambda_2$ (Case C in FIG. 4C) will be driven back to the transparency state at $\lambda_2$ (Case D in FIG. 4D) rapidly by the light at $\lambda_2$ 718 passing through the loss medium 708 when pulsed light at $\lambda_1$ 722; 772 is removed. The state of the active medium 708 is again analogous to Case D, as illustrated in FIG. 4D.

The pulsed light at $\lambda_1$ 722 entering the port ASin1 716 will de-excite the active medium 708, providing loss at the operating wavelength $\lambda_2$ to the active medium 708 in the gray area of Waveguide A 702.

Figure 8B:
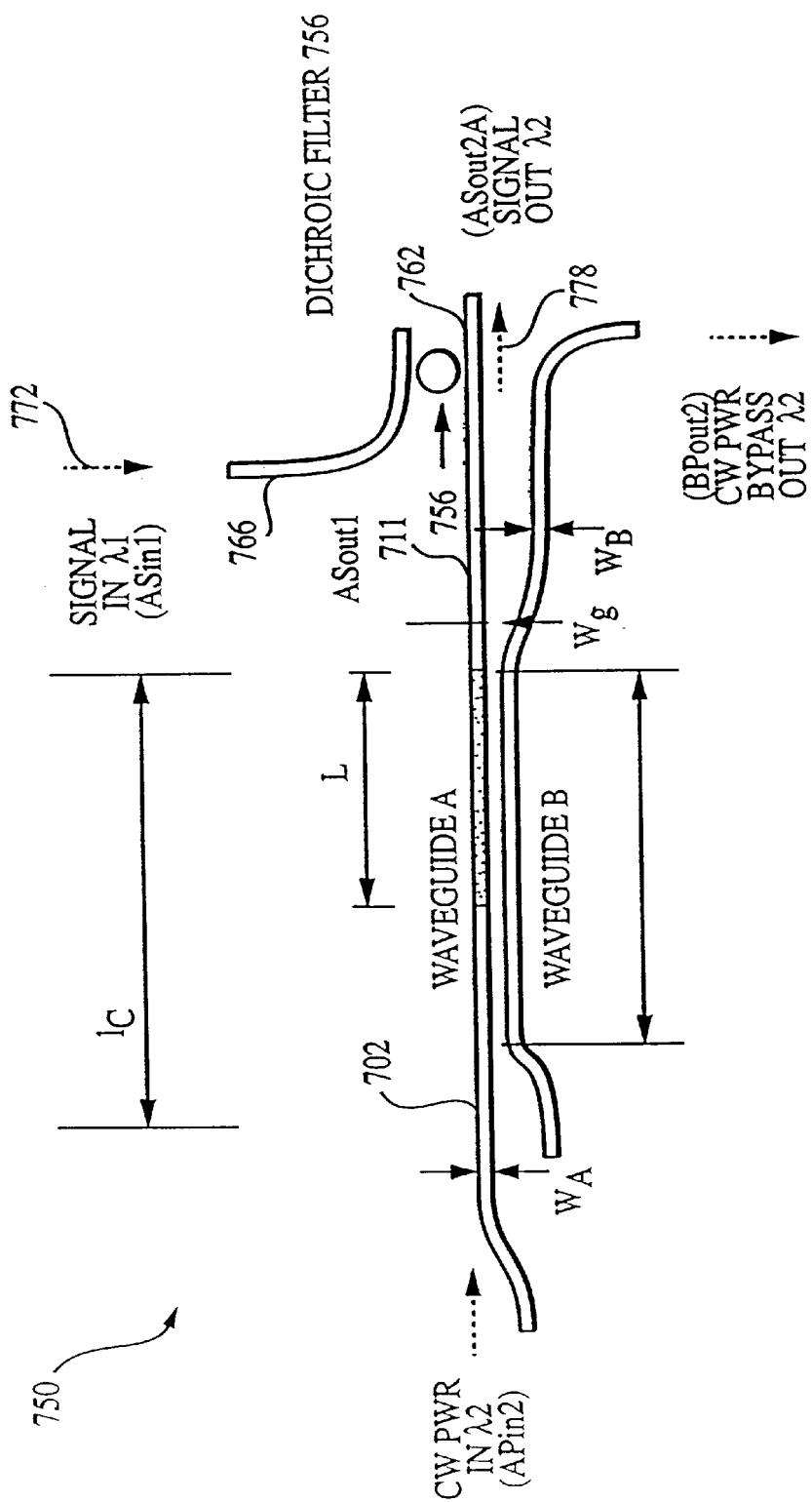
FIG. 8B illustrates a third embodiment of a phosistor logic gate utilizing directionally coupled waveguides and a dichroic filter.

It should be understood that the pulsed light at $\lambda_1$ 722, 772 can be input to the active medium 708 on Waveguide A 702 in any manner of implementation, in addition to the input structures 706 and 756 described in FIGS. 8A and 8B.

Since the active medium 708 of devices 700; 750 of FIGS. 8A and 8B is operated at the absorbing or loss mode, we say that this phosistor has a "loss gate". This gate is in the input arm (Waveguide A 702).

Figure 9:
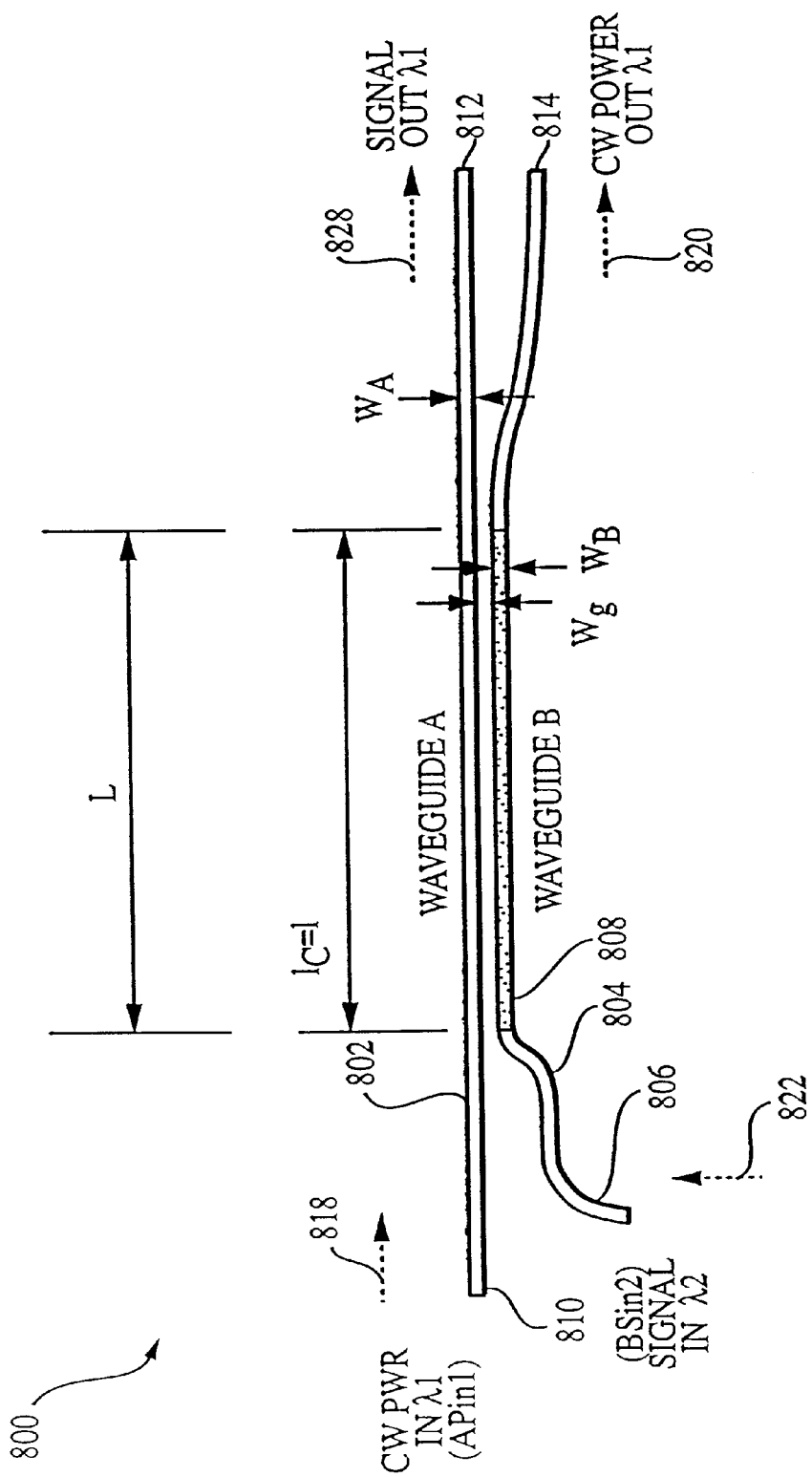
FIG. 9 illustrates a fourth embodiment of a phosistor logic gate utilizing directionally coupled waveguides.

It should be understood that due to the signal inversion of this device, i.e. a pulse at $\lambda_1$ in ("high" energy) causes a zero $\lambda_2$ pulse out ("no" energy), and, conversely, while no pulse at $\lambda_1$ is input ("no" energy), a pulse at $\lambda_2$ will be output ("low" energy). Thus, this device can function as an inverter.
Exemplary Device 4:

FIG. 9 illustrates a fourth general embodiment 800 of a phosistor device employing directionally coupled waveguides. The device can perform as a switching element and can in particular switch or convert a stream of ultrafast (picosecond, femtosecond) optical pulses at high energy and low wavelength to a stream of ultrafast optical pulses at comparatively low energy (comparatively high wavelength). The device can be referred to as an "Ultrafast Output-Arm-Gain-Gate High-to-Low-Energy Phosistor" (OGHL Phosistor 800).

OGHL Phosistor 800 includes a first Waveguide A 802 and a second Waveguide B 804. The Waveguide B 804 includes an active medium 808, which is illustrated as a gray region in FIG. 9. As described above, Waveguide B 804 can be implemented as waveguide 400 with active medium 420 in a useful embodiment. The Waveguide A 802 includes an input port APin1 810 and an output port ASout1 812. The Waveguide B 804 includes an input port BSin2 806 and an output port BPout1 814 which doubles as a possible input port (not shown in FIG. 9).

For the input port labeled "APin1" (810), "P" stands for Power-Supply beam, "A" refers to Waveguide A 802, "in" refers to 810 being an input port, and "1" refers to the input wavelength being $\lambda_1$.

For the output port labeled "ASout1" (812), "S" stands for Signal beam, "A" refers to Waveguide A 802, "out" refers to 812 being an output port, "1" refers to the input wavelength being $\lambda_1$.

For the input port labeled "BSin2" (806), "S" stands for Signal beam, "B" refers to Waveguide B 804, "in" refers to 806 being an input port, and "2" refers to the input wavelength being $\lambda_2$.

For the output port labeled "BPout1" (814), "P" stands for Power-Supply beam, "B" refers to Waveguide B 804, "out" refers to 814 being an output port, and "1" refers to the input wavelength being $\lambda_1$.

Continuous wave (CW) light having wavelength $\lambda_1$ (at $\lambda_1$) (CW PWR IN $\lambda_1$) 818 enters at the port APin1 810 on the Waveguide A 802. The CW light at $\lambda_1$ 818 propagates along the Waveguide A 802 and is subsequently transferred to Waveguide B 804 after a coupling length $l_C$. The coupling length is defined as the length at which a wave in one waveguide fully couples into another waveguide coupled to the first waveguide. In this device 800, the interaction length l, defined as the length of interaction between Waveguides A 802 and B 804, is equal to the full coupling length $l_C$ so that $l=l_C$. In FIG. 9, $l_C$ and l are shown to be 15 μm. The CW light at $\lambda_1$ 818 then exits from Waveguide B 804 at the port BPout1 814 as CW light at $\lambda_1$ (CW POWER OUT) 820. As the portion of CW light at $\lambda_1$ 818 propagates across the active medium 808, it drives the active medium 808 to a state of transparency at $\lambda_1$. The intensity of $\lambda_1$ must be high enough so that $I_1 > (1/\eta)I_{1Sat}$. That is, the intensity of the light at $\lambda_1$ must exceed the saturation intensity divided by η, the effective percentage of leakage power to the Waveguide B 804 when there is no pulsed light at $\lambda_2$ 822 entering the port BSin1 606 (i.e., an input off state). This state of the active medium 808 is analogous to Case C, as illustrated in FIG. 4C.

The input port BSin2 806 on Waveguide B 804 is the input signal port for pulsed light having wavelength $\lambda_2$ (SIGNAL IN $\lambda_2$) 822. The pulsed light $\lambda_2$ 822 entering the port BSin2 806 will excite the active medium 808, providing gain at the operating wavelength $\lambda_1$ to the active medium 808 in the gray area of Waveguide B 804. This state of the active medium 808 is analogous to Case B, as illustrated in FIG. 4B.

The CW light at $\lambda_1$ 818 from input port APin1 810 gains energy in the active medium 808 so that a portion of the CW light at $\lambda_1$ 818 does not transfer to Waveguide B 804 and thus does not exit from the output BPout1 814. Rather, this portion of the CW light at $\lambda_1$ 818 propagates through Waveguide A 802 and exits out of output port ASout1 812 as a pulse of light at $\lambda_1$ (SIGNAL OUT $\lambda_1$) 828.

In the case of FIG. 9 the net effect is that the pulsed light at $\lambda_2$ 822 into port BSin2 806 generates a pulse of light at $\lambda_1$ 828 exiting port ASout1 812 while a light at $\lambda_1$ 818 still transfers to Waveguide B 804 and exits from the output BPout1 814.

In an exemplary embodiment, the wavelength $\lambda_1$ can be at 820 nm, $\lambda_2$ can be at 800 nm, and the Waveguide A 802 can be implemented as the $Al_xGa_{1-x}As$ Waveguide 400, illustrated in FIG. 5, and having alloy composition x at 0.3 giving a bandgap energy of around 690 nm. Thus the core material is transparent at the wavelength $\lambda_2$ of 800 nm. As shown in FIG. 5, the cross-sectional dimensions of the waveguide 400 can be 0.4 μm wide by 0.25 μm thick. FIG. 9 illustrates that Waveguide A 802 is 0.4 μm wide and is located at an approximately parallel distance from Waveguide B 804 of 0.4 μm.

As described above, Waveguide A 802 can be implemented as waveguide 400 with active medium 420 (See FIG. 5) in a useful embodiment. As shown in FIG. 9, the length L of the active medium 808 is equal to the coupling length $l_C$ ($L=l_C$). The length L of the active medium 808 may be somewhat longer or shorter than $l_C$. Varying the length L of the active medium 808 relative to the coupling length $l_C$ will vary the input to output signal conversion efficiency.

In should be understood that in the typical operation of Phosistors 800 light can be continuous wave (CW) light, but the light can otherwise be a pulsed light in some specific applications. For the purpose of illustration and not limitation the light is taken as CW light.

It should be understood that the speed of switching can be fast as the active medium 808, when in the gain state at $\lambda_1$ (Case B in FIG. 4B), will be driven back to the transparency state at $\lambda_1$ (Case C in FIG. 4C) rapidly by the light at $\lambda_1$ 818 passing through the gain medium 808 when pulsed light at $\lambda_2$ 822 is removed. The state of the active medium 808 is again analogous to Case C, as illustrated in FIG. 4C.

The pulsed light at $\lambda_2$ 822 entering the port BSin2 806 will excite the active medium 808, providing gain at the operating wavelength $\lambda_1$ to the active medium 808 in the gray area of Waveguide B 804.

It should be understood that the pulsed light at $\lambda_2$ 822 can be input to the active medium 808 on Waveguide B 804 in any manner of implementation. In particular, the pulsed light at $\lambda_2$ 822 can enter either input port BSin2 806 or output port BPout1 814 which doubles as a possible input port (not shown in FIG. 9). The problem of any mixing of light that might occur can be addressed with use of a dichroic filter of coupler (not shown).

Since the active medium 808 of device 800 of FIG. 9 is operated at the gain mode, we say that this phosistor has a "gain gate". This gate is in the output arm (Waveguide B 804).

It should be understood that several versions of Photonic Flip-Flops, a Photonic AND/NAND logic gate, and Photonic Random Access Memory (RAM) with latching, enable, and reset devices can be constructed and implemented utilizing the exemplary embodiments 1 through 4.

Of course, it should be understood that a wide range of changes and modifications can be made to the preferred exemplary embodiments described above. Thus, it is intended that the foregoing detailed description be regarded as illustrative rather than limiting, and that it be understood that it is the following claims, including all equivalents, which are intended to define the scope of this invention.

What is claimed is:

1. A light transfer device comprising:
 a first light pathway having a first input and a first output;
 a second light pathway having a second output, said second light pathway coupled to said first light pathway, wherein light from said first input is transferable between said first and second light pathways; and
 an active medium positioned along one of said first and second light pathways, wherein said active medium is capable of receiving light that modifies modifies a gain property or a loss property of said active medium so that said active medium controls the transfer of light between said first and second pathways.

2. The device of claim 1 wherein said active medium further comprises a plurality of quantum wells defined within a substrate.

3. The device of claim 1 wherein said active medium further comprises a thin layer of material within which the potential energy of an electron is less than outside the layer and the motion of an electron perpendicular to said layer is quantized.

4. The device of claim 3 wherein the thickness of said medium is between 1 and 20 nanometers.

5. The device of claim 1 wherein said first light pathway and said second light pathway comprise a directional coupler.

6. The device of claim 5 wherein said pathways of said directional coupler are formed within a substrate.

7. The device of claim 6, further comprising a dichoric coupler having a third input, wherein light from said third input is transferable to said first light pathway.

8. The device of claim 7 wherein said active medium is capable of receiving light from said third input.

9. The device of claim 8 wherein said device is linkable with other light transfer devices to implement switching logic.

10. A light transfer component comprising:
 a first light pathway having a first input and a first output;
 a second light pathway having a second output, said second light pathway coupled to said first light pathway, wherein light from said first input is transferable from said first input of said first light pathway to said second output of said second light pathway; and
 an active medium positioned along said first light pathway, wherein said active medium is capable of receiving light that modifies a gain property or a loss property of said active medium so that at least a portion of the light from said first input remains on said first light pathway and is output from said first output of said first light pathway.

11. The component of claim 10 wherein said active medium is drivable to a gain state in response to light so that light from said first input of said first light pathway is amplified in said active medium along said first light pathway and the effect on the transferability of the light to said second output of said second light pathway is negligible.

12. The component of claim 11 wherein said active medium is positioned between said first input and said first output of said first light pathway.

13. The component of claim 12 wherein the refractive index of said active medium is not changed substantially upon driving of said medium to said gain state.

14. A light transfer component comprising:
 a first light pathway having a first input and a first output;
 a second light pathway having a second output, said second light pathway coupled to said first light pathway, wherein light from said first input is transferable from said first input of said first light pathway to said second output of said second light pathway; and an active medium positioned along said second light pathway, said active medium capable of receiving light that modifies a gain property or a loss property of said active medium.

15. The component of claim 14 wherein said active medium is drivable in response to light to a loss state having absorptive properties so that the transferability of the light from said first input of said first light pathway to said second output of said second light pathway is affected by absorption by the medium.

16. The component of claim 15 wherein said active medium is positioned between a second input and said second output of said second light pathway.

17. The component of claim 14 wherein said active medium is drivable to a gain state in response to light so that light from said first input of said first light pathway is amplified in said active medium.

18. A light transfer component comprising:

a first light pathway having a first input and a first output;

a second light pathway having a second output, said second light pathway coupled to said first light pathway, wherein light from said first input is transferable from said first input of said first light pathway to said second output of said second light pathway; and an active medium positioned along said first light pathway, wherein said active medium is capable of receiving light that modifies a gain property or a loss property of said active medium so that substantially all of the light from said first input no longer remains on said first light pathway.

19. The light transfer component of claim 18 wherein said modified active medium prevents substantially all of the light from said first input to be diverted from said first output of said first light pathway.

20. The light transfer component of claim 18 wherein said active medium is capable of receiving light that modifies said active medium so that said active medium can absorb substantially all of the light from said first input of said first light pathway so that the transferability of the light to said second output of said second light pathway is negligible.

21. The light transfer component of claim 20 wherein said active medium is positioned between said first input and said first output of said first light pathway.

22. A light transfer device comprising:

a first light pathway having a first input and a first output;

a second light pathway having a second output, said second light pathway optically coupled to said first light pathway, wherein light from said first input is transferable from said first input of said first light pathway to said second output of said second light pathway; and an active medium positioned along said second light pathway, wherein said active medium is capable of receiving light that modifies a gain property or a loss property of said active medium so that at least a portion of the light from said first input remains on said first light pathway and is output from said first output of said first light pathway.

23. The device of claim 22 wherein said modified active medium further comprises an absorbing medium for light that hinders the transferability of the light from said first input of said first light pathway to said second output of said second light pathway.

24. The device of claim 23 wherein said active medium is positioned between a second input and said second output of said second light pathway.

25. A multi-port light transfer device comprising:

an active excitable medium capable of receiving input energy in the form of light propagating from a first port to a second port via wave coupling, wherein the active excitable medium can transfer a portion of the light energy to at least a third port in response to the presence or absence of light that modifies a gain property or a loss property of the active medium into the third port and incident on the active excitable medium.

26. The multi-port light transfer device according to claim 25, further comprising at least a first and a second waveguide, said first port being on said first waveguide and said second port being on said second waveguide;

wherein the input energy in the form of light propagates from the first port on the first waveguide to the second port on the second waveguide via wave coupling so that the first and second waveguides form a directional coupler having a finite coupling length.

27. The multi-port light transfer device according to claim 26 wherein said coupling length is less than about 100 microns.

28. The multi-port light transfer device according to claim 27 wherein the active excitable medium is positioned along the first waveguide over a portion of the coupling length.

29. The multi-port light transfer device according to claim 25 further comprising a dichroic coupler, wherein the light energy into the third port and incident on the active excitable medium is coupled to the first waveguide utilizing said coupler.

30. A method of manipulating an active medium and energy in the form of light to implement a logical switching function, said method comprising the steps of:

driving said active medium to one of a plurality of states with a continuous wave power supply beam;

applying input energy in the form of light to drive the active medium to another of said plurality of states; and controlling output energy in the form of light through the driving of the active medium and the application of the input energy, wherein the active medium is capable of receiving light that modifies a gain property or a loss property of the active medium.

31. A light transfer device comprising:

a first structure capable of wave propagation, wherein the first structure comprises a first device input port for receiving a first optical beam, a first device output port connected to the first device input port along the length of the first structure, and an active excitable medium positioned between the first device input and first device output ports along a portion of the length of the first structure, wherein the active excitable medium is capable of receiving a second optical beam that modifies the interference properties of the active excitable medium so that the first optical beam is amplified photonically and achieves gain through the active excitable medium to create a third optical beam; and a second structure capable of wave propagation, wherein the second structure is positioned adjacent said first structure and is coupled to the first structure so that the first optical beam is transferred from the first structure to the second structure with negligible loss and wherein the second structure comprises a second output port for transmission of the transferred first optical beam.

32. The light transfer device according to claim 31, wherein the third optical beam is directed in part to the first device output port, and when the second optical beam is not present, the active excitable medium is transparent to the first optical beam so that no third optical beam is created.

33. A light transfer device comprising:
a first structure capable of wave propagation, wherein the first structure comprises a first device input port for receiving a first optical beam, a first device output port connected to the first device input port along the length of the first structure, and an active excitable medium positioned between the first device input and first device output ports along a portion of the length of the first structure;
a second structure capable of wave propagation, wherein the second structure is positioned at least partly adjacent the first structure and is coupled to the first structure so that the first optical beam is transferred from the first structure to the second structure with negligible loss and wherein the second structure comprises a second output port for transmission of the transferred first optical beam;
a third structure capable of wave propagation, wherein the third structure comprises a second device input port and wherein the third structure is positioned next to the first structure and is capable of coupling a second optical beam received at the second device input to the first structure so that when the second optical beam is present, the second optical beam modifies the interference properties of the active excitable medium so that the first optical beam is amplified photonically and achieves gain through the active excitable medium to create a third optical beam which is directed in part to the first device output port, and when the second optical beam is not present, the active excitable medium is transparent to the first optical beam so that no third optical beam is created.

34. A device for transmitting photons, said device comprising:
a first waveguide, wherein the first waveguide comprises a first port for receiving a first optical beam, a second port, and an active medium, said active medium being capable of excitement by a third optical beam thereby providing gain to the first optical beam in the form of stimulated photon emission so that the separate, second optical beam is created and propagates toward the second port; and
a second waveguide, wherein the second waveguide is coupled to the first waveguide and includes a third port, wherein the coupling between the first and second waveguide allows the diversion of photons in the first optical beam from the first waveguide to the second waveguide toward said third port.

35. The device of claim 34 wherein said active medium is oriented within said first waveguide so that at least some photons of said first optical beam pass by said medium before diversion to said second waveguide.

36. The device of claim 35 wherein said active medium causes one or more photons of said first optical beam to be amplified through the addition of photons to said first optical beam, thereby creating said second optical beam propagating toward said third port.

37. The device of claim 36 wherein said first optical beam further comprises a continuous wave beam.

38. The device of claim 37 wherein said first optical beam further comprises a stream of optical pulses.

39. The device of claim 34 wherein said device is capable of operation in at least a first and a second operative modes;
when in said first operative mode said device channels a series of photons in said first optical beam received from said first port to said second port with negligible loss of energy via wave coupling; and
when in said second operative mode said device produces a second optical beam propagating toward said third port.

40. A method of transmitting a first power light beam through a transmission device including at least a first and a second coupled waveguide, said method comprising the steps of:
providing an active medium along one of said first and second waveguides;
providing said first power light beam to an input of said first waveguide;
channeling said first power light beam from said first waveguide to said second waveguide;
exciting said active medium by introducing a second, higher-wavelength switching light beam to said active medium to change the interference properties of said medium and create a third, lower wavelength signal light beam propagating toward an output of said first waveguide.

41. The method of claim 40 further comprising the steps of:
turning off said switching light beam to cause excitement of said active medium to cease and said lower wavelength signal light beam to turn off.

42. The method of claim 40 further comprising the steps of:
providing a second transmitting device having a third and a fourth coupled waveguides and an active medium along at least a portion of one of said waveguides;
providing said lower wavelength signal light beam from said first device as an input light beam to said third coupled waveguide;
channeling said first power light beam from said third waveguide to said fourth waveguide;
exciting said active medium by introducing a higher-wavelength switching light beam to said active medium to change the interference properties of said medium and create a second, lower wavelength signal light beam propagating toward an output of said third waveguide.

43. The method of claim 40 further comprising the steps of:
providing a second transmitting device having a third and a fourth coupled waveguides and an active medium along at least a portion of one of said waveguides;
providing said first power light beam from said second waveguide of said first device as an input light beam to said third coupled waveguide;
channeling said first power light beam from said third waveguide to said fourth waveguide;
exciting said active medium by introducing a higher-wavelength switching light beam to said active medium to change the interference properties of said medium and create a second, lower wavelength signal light beam propagating toward an output of said third waveguide.

44. A directional coupler capable of modifying the propagation direction of a low energy photon beam via a self-interference effect of the first propagating beam, said coupler comprising:
- a first input signal port capable of receiving said low energy photon beam;
- a second input signal port capable of receiving a high energy photon beam;
- an active medium positioned near said second input signal port, wherein the active medium is drivable to a gain state by the incidence of said high energy photon beam, and wherein the active medium is otherwise drivable to a transparency state;
- a first output port capable of transmitting a low energy photon beam from the active medium, wherein the low energy photon beam will be amplified when the active medium is in the gain state and of negligible energy when the active medium is in the transparency state.

45. The device of claim 44 wherein said active medium further comprises a plurality of quantum wells defined within a substrate.

46. The device of claim 44 wherein said active medium further comprises a thin layer of material within which the potential energy of an electron is less than outside the layer and the motion of an electron perpendicular to said layer is quantized.

47. The device of claim 46 wherein the thickness of said medium is between 1 and 20 nanometers.

48. The device of claim 44 wherein the distance between said first input port and said first output port is less than about 100 microns.

49. A logic device comprising:
- a plurality of directional couplers, said directional couplers each being capable of modifying the propagation direction of a low energy photon beam through an active medium having interference properties modifiable via a high energy photon beam, said directional couplers being linked by inputs and outputs capable of transmitting said low energy photon beam through one or more switchable propagation paths.

50. The logic device of claim 49 wherein said interference properties are modifiable via a high wavelength light beam, and said low energy photon beam further comprises a relatively low wavelength light beam.

51. The logic device of claim 49 wherein said interference properties of said active medium are modifiable without modifying substantially the refractive index of said active medium.

52. The logic device of claim 49 wherein each of said directional couplers further comprises:
- at least a first input signal port capable of receiving said low energy photon beam;
- a second input signal port capable of receiving a high energy photon beam;
- an active medium positioned near said second input signal port, wherein the active medium is drivable to a gain state by the incidence of said high energy photon beam, and wherein the active medium is otherwise drivable to a transparency state;
- a first output port capable of transmitting a low energy photon beam from the active medium, wherein the low energy photon beam will be amplified when the active medium is in the gain state and of negligible energy when the active medium is in the transparency state.

53. The logic device of claim 52 wherein said interference properties of said active medium are modifiable without modifying substantially the refractive index of said active medium.

54. A logic device comprising:
- a first wave coupler device having
  - a first light pathway receiving light from a first input;
  - a second light pathway having a second output, said second light pathway coupled to said first light pathway, wherein light from said first input is transferable to said second light pathway; and
  - an active medium positioned along one of said first and second light pathways, wherein said active medium is capable of receiving light that modifies said active medium so that said active medium controls the transfer of light between said first and second pathways; and
- a second wave coupler device having
  - a third light pathway receiving light from one of said first and second pathways of said first wave coupler device;
  - a fourth light pathway having a second output, said fourth light pathway coupled to said third light pathway, wherein light from said third light pathway is transferable to said fourth light pathway; and
  - an active medium positioned along one of said third and fourth light pathways, wherein said active medium is capable of receiving light that modifies said active medium so that said active medium controls the transfer of light between said third and fourth pathways.

55. A light transfer component comprising:
- a first light pathway having a first input and a first output;
- a second light pathway having a second output, said second light pathway coupled to said first light pathway, wherein light from said first input is transferable from said first input of said first light pathway to said second output of said second light pathway; and
- an active medium positioned along said first light pathway, wherein said active medium is capable of receiving light that modifies said active medium so that at least a portion of the light from said first input remains on said first light pathway and is output from said first output of said first light pathway, wherein the refractive index of said active medium is not changed substantially upon driving of said medium to a gain state.

56. A multi-port light transfer device comprising:
- an active excitable medium capable of receiving input energy in the form of light propagating from a first port to a second port via wave coupling, wherein the active excitable medium can transfer a portion of the light energy to at least a third port in response to the presence or absence of light into the third port and incident on the active excitable medium, wherein a coupling length is less than about 100 microns.

* * * * *